US009287972B2

(12) United States Patent
Kishida et al.

(10) Patent No.: US 9,287,972 B2
(45) Date of Patent: Mar. 15, 2016

(54) DISTRIBUTED OPTICAL FIBER SOUND WAVE DETECTION DEVICE

(75) Inventors: Kinzo Kishida, Kobe (JP); Kenichi Nishiguchi, Kobe (JP); Che-Hsien Li, Kobe (JP)

(73) Assignee: NEUBREX CO., LTD (JP)

( * ) Notice: Subject to any disclaimer, the term of this patent is extended or adjusted under 35 U.S.C. 154(b) by 180 days.

(21) Appl. No.: 14/350,310

(22) PCT Filed: Sep. 11, 2012

(86) PCT No.: PCT/JP2012/005736
§ 371 (c)(1),
(2), (4) Date: Apr. 7, 2014

(87) PCT Pub. No.: WO2013/051196
PCT Pub. Date: Apr. 11, 2013

(65) Prior Publication Data
US 2014/0255023 A1    Sep. 11, 2014

(30) Foreign Application Priority Data
Oct. 5, 2011    (JP) .................. 2011-221026

(51) Int. Cl.
*H04B 10/08*   (2006.01)
*H04B 10/071*  (2013.01)
*G01H 9/00*    (2006.01)

(52) U.S. Cl.
CPC ............. *H04B 10/071* (2013.01); *G01H 9/004* (2013.01)

(58) Field of Classification Search
CPC ....... H04B 10/071; G01H 9/004; G01H 9/006
USPC ............... 398/21, 13, 20, 25, 28, 33
See application file for complete search history.

(56) References Cited

U.S. PATENT DOCUMENTS

| 7,274,441 B2 * | 9/2007 | Payton | ............... G01D 5/35383 356/73.1 |
| 8,682,173 B1 * | 3/2014 | Hiller | ................... H04B 10/071 398/104 |

(Continued)

FOREIGN PATENT DOCUMENTS

| CN | 101603856 | 12/2009 |
| JP | 6-117915  | 4/1994  |

(Continued)

OTHER PUBLICATIONS

Chinese Patent Application No. 201280047302.3—Office Action issued on Feb. 3, 2015.
International Search Report of Nov. 27, 2012.

*Primary Examiner* — M. R. Sedighian
(74) *Attorney, Agent, or Firm* — Gerald E. Hespos; Michael J. Porco; Matthew T. Hespos

(57) ABSTRACT

A distributed optical fiber sound wave detection device is provided with an optical pulse emission unit that causes an optical pulse to be incident into the optical fiber, and a Rayleigh scattered light reception unit that receives Rayleigh scattered light produced inside the optical fiber. The optical pulse emission unit outputs the optical pulse that is modulated using a code sequence which has a predetermined length and by which the optical pulse is divided into a plurality of cells. The Rayleigh scattered light reception unit includes a phase variation derivation unit that performs demodulation corresponding to the modulation in the optical pulse emission unit on the Rayleigh scattered light and determines a phase variation thereof from the demodulated Rayleigh scattered light, and a sound wave detection unit that determines a sound wave that has struck the optical fiber from the phase variation determined by the phase variation derivation unit.

12 Claims, 10 Drawing Sheets

(56) References Cited

U.S. PATENT DOCUMENTS

| | | | |
|---|---|---|---|
| 8,699,009 B2* | 4/2014 | Li | G01B 11/18 356/33 |
| 8,942,556 B2* | 1/2015 | Zhao | H04B 10/071 398/17 |
| 2012/0111104 A1* | 5/2012 | Taverner | G01H 9/004 73/152.16 |

FOREIGN PATENT DOCUMENTS

| | | |
|---|---|---|
| JP | 9-21694 | 1/1997 |
| JP | 9-236513 | 9/1997 |
| JP | 2003-344148 | 12/2003 |
| JP | 2007-33183 | 2/2007 |
| JP | 2010-216877 | 9/2010 |

* cited by examiner

FIRST OPTICAL PULSE A$_1$

SECOND OPTICAL PULSE B$_1$

MATCHING FILTER A$_1$

MATCHING FILTER B$_1$

DISTRIBUTED OPTICAL FIBER SOUND WAVE DETECTION DEVICE

TECHNICAL FIELD

The present invention relates to a distributed optical fiber sound wave detection device that uses an optical fiber as a sensor and can detect, with high sensitivity and high accuracy, sound waves that have arrived at various regions in the longitudinal direction of the optical fiber.

BACKGROUND ART

The technique using an OTDR (Optical Time Domain Reflectometer) is known as an optical fiber sensing technique by which Rayleigh backscattered light (referred to hereinbelow simply as "Rayleigh scattered light") produced by injection of probe light into an optical fiber is used to measure line characteristics of the optical fibers (loss or position of breaks in the optical fiber) or the distribution of strains in the longitudinal direction of the optical fiber.

For example, a method described in Japanese Patent Application Publication No. H9-236513 is known as a method for measuring a line characteristic in the OTDR. With this method, probe light is inputted (incident) into an optical fiber and the line characteristic is measured on the basis of Rayleigh scattered light produced inside the fiber by such an input.

More specifically, an optical pulse is inputted (incident) as the probe light from one end (input end) of the optical fiber. The Rayleigh scattered light that has been produced in various regions in the longitudinal direction of the optical fiber by the input of the optical pulse and returned to the input end is measured. The line characteristic of the optical fiber is measured from the intensity of the measured Rayleigh scattered light and the position where the Rayleigh scattered light has been produced. In this case, the position in the longitudinal direction of the optical fiber where the Rayleigh scattering has occurred is specified on the basis of the reciprocation time required for the optical pulse inputted from the input time to be reflected inside the optical bier and return to the input end.

Further, for example, a method for using the frequency shift of Rayleigh scattered light produced in a region where strains have occurred in an optical fiber is known as a method for measuring the distribution of strains in the longitudinal direction of the optical fiber in the OTDR.

With this method, an optical pulse is inputted (incident) from the input end of the optical fiber. The Rayleigh scattered light that has been produced in various regions in the longitudinal direction of the optical fiber by the input of the optical pulse and has returned to the input end is measured. Where a pressure is applied to the optical fiber and strains are produced inside the optical bier, there is a shift in frequency of the Rayleigh scattered light produced in the region where the strains have appeared. As a result, the phase of the measured Rayleigh scattered light changes with respect to that of the Rayleigh scattered light produced in the optical fiber in the initial state (state in which the pressure has not been applied). This phase variation makes it possible to detect the pressure applied to the optical fiber. In this case, the phase variation can be obtained with good accuracy by inputting the optical pulse a plurality of times and finding the average of the Rayleigh scattered light in the various regions.

Thus, in the OTDR, the phase variation of Rayleigh scattered light in various regions in the longitudinal direction of the optical fibers can be detected, and strains (pressure applied to the optical fiber) in the regions in the longitudinal direction of the optical fiber can be detected with high sensitivity and high accuracy on the basis of the phase variation.

The method using the abovementioned phase variation of Rayleigh scattered light enables high-sensitivity and high-accuracy detection of strains produced in various regions in the longitudinal direction of the optical fiber. Therefore, a sound wave that has struck (reached) the regions of the optical fiber apparently can be detected by using such a method.

More specifically, where a certain sound wave propagates in a gas, liquid, or solid medium and reaches, that is, strikes, an optical fiber, tiny strains appear in the optical fiber. The strains depend on the frequency or amplitude of the sound wave that has struck the optical fiber. Accordingly, the strains produced in the regions of the optical fiber can be detected by the method using the abovementioned phase variation, and by analyzing the strains, it is possible to detect the sound wave (frequency or amplitude) and specify the position of the sound wave emission source.

In such a method, the resolution in the longitudinal direction (longitudinal resolution) when the sound wave is detected in the regions in the longitudinal direction of the optical fiber is determined by the pulse width of the probe light (optical pulse) inputted to the optical fiber. For example, when optical waves that have struck two points spaced in the longitudinal direction of the optical fiber are detected, where the spacing of the points is less than the pulse width of the probe light, it is impossible to determine which of the sound waves that have struck the two points has caused the derived phase variation of the Rayleigh scattered light. Therefore, the pulse width should be reduced to realize a high longitudinal resolution.

However, where the pulse width of the probe light is reduced, the energy of optical pulses decreases. As a result, the signal strength of the scattered light that is scattered in the regions of the optical fiber and returns to the input end decreases.

Further, in the method using the abovementioned phase variation, strains (strains of the optical fiber), which do not fluctuate over a short period of time, are detected. Therefore, the phase variation of the Rayleigh scattered light in each region is determined with good accuracy by measuring multiple times the Rayleigh scattered light produced in each region of the optical fiber and using the average thereof. However, since the strains in an optical fiber caused by a sound wave striking thereupon change over a very short period of time, the method of measuring multiple times the Rayleigh scattered light produced in the regions and using the average thereof cannot be used.

Thus, a sound wave is very difficult to detect with good accuracy by the method using the abovementioned phase variation.

SUMMARY OF THE INVENTION

It is an object of the present invention to provide a distributed optical fiber sound wave detection device that can detect a sound wave with high sensitivity and high accuracy and also realize high resolution.

The distributed optical fiber sound wave detection device according to an aspect of the present invention is a distributed optical fiber sound wave detection device that uses an optical fiber as a sensor and includes:

an optical pulse emission unit that causes an optical pulse to be incident into the optical fiber from one end of the optical fiber; and a Rayleigh scattered light reception unit that receives Rayleigh scattered light produced inside the optical fiber by the incidence of the optical pulse, wherein the optical pulse emission unit outputs the optical pulse that is modulated using a code sequence which has a predetermined length based on a length dimension of the optical fiber and by which the optical pulse is divided into a plurality of cells of a predetermined width; and the Rayleigh scattered light reception unit includes:

a phase variation derivation unit that performs demodulation corresponding to the modulation in the optical pulse emission unit on the Rayleigh scattered light and determines a phase variation thereof from the demodulated Rayleigh scattered light; and a sound wave detection unit that determines a sound wave that has struck the optical fiber from the phase variation determined by the phase variation derivation unit.

The objects, features, and advantages of the present invention will become more apparent from the following detailed description and accompanying drawings.

BEST MODE FOR CARRYING OUT THE INVENTION

First Embodiment

The first embodiment of the present invention is described hereinbelow with reference to FIGS. 1 to 6.

A distributed optical fiber sound wave detection device 10 according to the present embodiment uses an optical fiber (detection optical fiber) 12 as a sensor, detects sound waves that have struck each region in the longitudinal direction of the optical fiber with high sensitivity and high accuracy, and realizes a high resolution in the longitudinal direction (referred to hereinbelow also as "longitudinal resolution"). The distributed optical fiber sound wave detection device 10 according to the present embodiment can detect not only a sound wave that has struck a specific position (site) in the longitudinal direction (z-axis direction) of the detection optical fiber 12, but also the distribution of sound waves that have struck at the same time the regions in the longitudinal direction.

In the distributed optical fiber sound wave detection device 10, the detection optical fiber 12 can be used instead of a microphone to record the sound. For example, by inserting the detection optical fiber 12 in a well or the like and detecting a sound wave (for example, a sound wave with a frequency of about 1 kHz) propagating in the ground with the detection optical fiber 12, it is possible to observe the state of the well and underground conditions. In the medical field, by detecting a sound wave (for example, an ultrasound wave with a frequency of 3 MHz to 30 MHz) propagating inside a human body with the detection optical fiber 12, it is possible to observe the interior of the human body.

Figure 1:
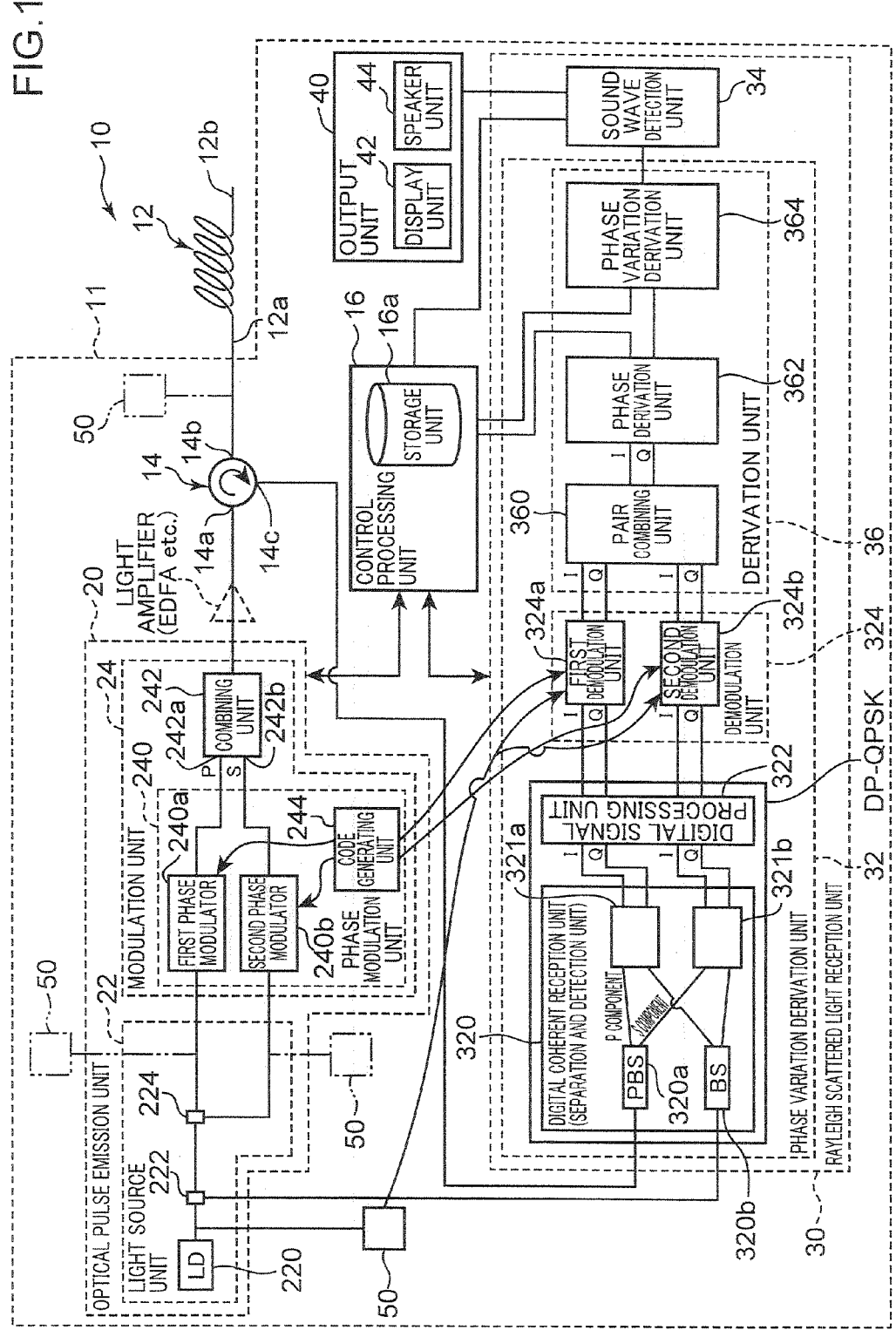
FIG. 1 is a functional block diagram showing the configuration of the distributed optical fiber sound wave detection device according to the first embodiment of the present invention.

As shown in FIG. 1, the distributed optical fiber sound wave detection device 10 is provided with a device main body 11 and the detection optical fiber 12. The device main body 11 is provided with an optical pulse emission unit 20, a phase measurement unit 50, an optical circulator 14, a Rayleigh scattered light reception unit 30, a control processing unit 16, and an output unit 40.

In the distributed optical fiber sound wave detection device 10, an optical amplifier such as an erbium-doped optical fiber (EDFA) may be disposed between the optical pulse emission unit 20 and the optical circulator 14.

Further, in the distributed optical fiber sound wave detection device 10, an LN switch for ensuring the dimming ratio of the optical pulse outputted from the optical pulse emission unit 20 may be disposed between the optical pulse emission unit 20 and the optical circulator 14. In this case, it is preferred that the dimming ratio of the optical pulse outputted from the optical pulse emission unit 20 in the distributed optical fiber sound wave detection device 10 be equal to or greater than several tens of decibels.

The detection optical fiber 12 is used as a sensor for detecting the sound wave that has struck the optical fiber 12. The detection optical fiber 12 is a long optical fiber having a first end section (one end) 12a and a second end section 12b which is the end section on the side opposite that of the first end section 12a. More specifically, for example, when the distributed optical fiber sound wave detection device 10 is used for sound wave detection in the abovementioned well, the length dimension (total length) L of the detection optical fiber 12 is about 30 km, and when the distributed optical fiber sound wave detection device is used for sound wave (ultrasound wave) detection in the medical field, the length is about 100 m.

An optical pulse (probe light) is incident into the detection optical fiber 12 from the first end section 12a of the optical fiber 12, and the light (Rayleigh back-scattered light) relating to the Rayleigh scattering image produced inside the detection optical fiber 12 because of the optical pulse is emitted to the outside.

The optical pulse emission unit 20 is provided with a light source unit 22 outputting an optical pulse of a predetermined frequency, and a modulation unit 24 that performs modulation (in the present embodiment, phase modulation) of the optical pulse outputted from the light source unit 22. The optical pulse emission unit causes the optical pulse to be incident into the detection optical fiber 12 from the first end section 12a of the detection optical fiber 12.

The light source unit 22 has a light source 220, a first splitting unit 222, and a second splitting unit (spectral unit) 224 and outputs a first optical pulse and a second optical pulse.

Figure 2:
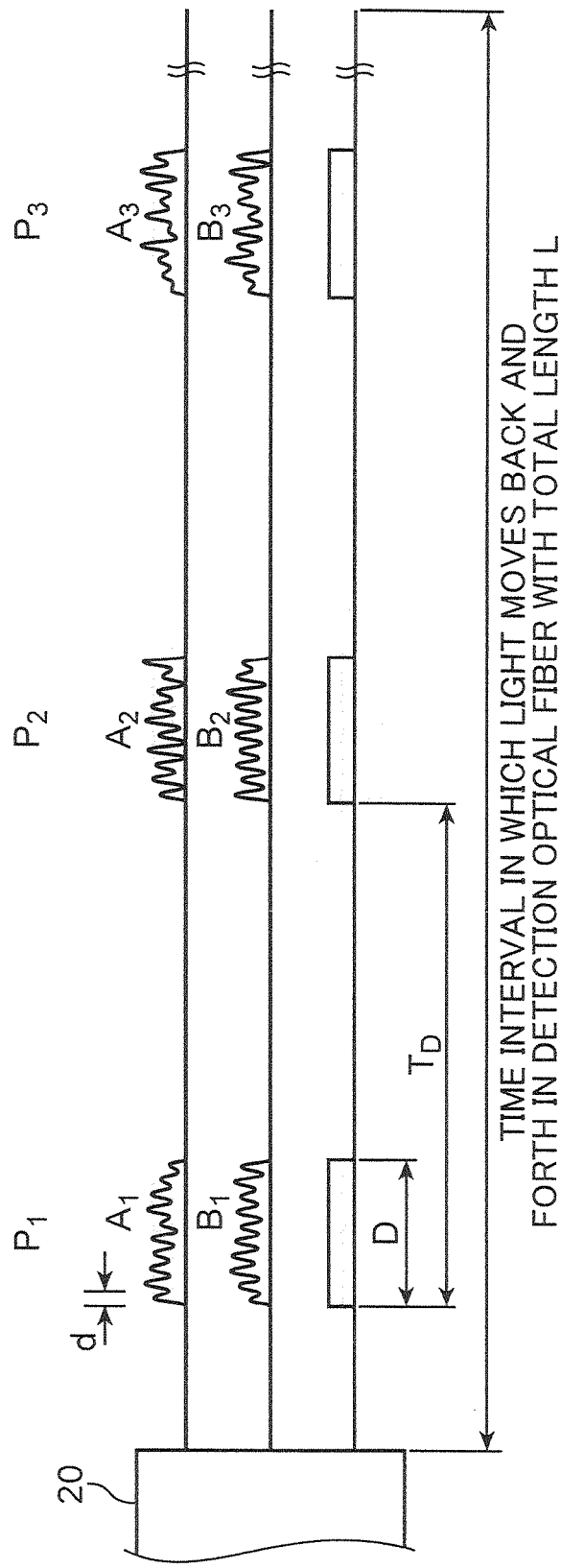
FIG. 2 is an explanatory drawing illustrating a phase-modulated optical pulse outputted from the optical pulse emission unit of the distributed optical fiber sound wave detection device.

The light source 220 can output (emit) optical pulses of predetermined frequencies. More specifically, as shown in FIG. 2, the light source 220 generates pulsed light by outputting optical pulses P1, P2, P3, . . . Pi having a predetermined pulse width D with a first time interval TD. The light source 220 outputs linearly polarized optical pulses Pi (pulsed light). The light source 220 is controlled by the control processing unit 16, and the oscillation wavelength (oscillation frequency) is changed by changing the temperature or drive current with the control processing unit 16. Further, in the light source 220, the output spacing of the optical pulses Pi is also controlled by the control processing unit 16. The light source 220 of the present embodiment is a laser diode (LD).

The pulse width D of each optical pulse Pi is set on the basis of the length dimension L of the detection optical fiber 12. More specifically, the larger is the pulse width D, the larger is the energy of the optical pulse Pi. Accordingly, the pulse width D is set such that when the Rayleigh scattered light produced in the vicinity of the second end section 12b by the optical pulse Pi to be incident from the first end section 12a of the detection optical fiber 12 is received by the Rayleigh scattered light reception unit 30, the received Rayleigh scattered light is ensured to have a sufficient signal strength (intensity of Rayleigh-scattered light) necessary for detecting the sound wave that has struck the vicinity of the second end section 12b of the detection optical fiber 12. The pulse width D generally also increases with the increase in the length dimension L of the detection optical fiber 12.

The time interval TD between the optical pulses Pi is set on the basis of the frequency of the sound wave that is the detection object of the distributed optical fiber sound wave detection device 10. This is described below in greater detail.

According to the Nyquist sampling theorem, the sound wave that is the detection object should be sampled at least twice over one period of the sound wave. Therefore, the time interval TD between the optical pulses Pi should be equal to or less than half of one period of the sound wave that is the detection object. Thus, the distribution of sound waves that can be detected (scanned) by one optical pulse Pi (distribution of sound waves that have struck each region in the longitudinal direction) is within a range in which the optical pulse Pi can move back and forth inside the detection optical fiber 12 over the sampling period of time. In a sound wave with a high frequency, one period is short and, therefore, the necessary sampling period is also short. As a result, the range in which the optical pulse Pi can move back and forth in the detection optical fiber 12 over the sampling period is short. As a consequence, a range in which the sound wave with a high frequency can be detected by one optical pulse Pi as a distribution along the detection optical fiber 12 is narrow (short). For this reason, where the sampling period is set to be equal to or longer than the optical pulse reciprocation time when the detection optical fiber 12 used as a sensor is longer than the range in which the optical pulse Pi can move back and forth over a sampling period determined by the period of the sound wave to be detected, aliasing occurs in the sound wave spectrum and the detected sound wave is disturbed. Further, where the sampling period is set to be equal to or shorter than the optical pulse reciprocation period, the Rayleigh scattered light is received simultaneously from a plurality of regions in the longitudinal direction of the detection optical fiber 12 and the entire distribution of sound waves cannot be detected.

Accordingly, in the distributed optical fiber sound wave detection device 10, the interval between the optical pulses Pi is made to be a time interval (first time interval) TD that is shorter than half of one period of the sound wave that is the detection object (when the frequency band of the sound wave that is the detection object is wide, the sound wave with the highest frequency in the frequency band), and a plurality of optical pulses P1, P2, P3, . . . Pi is advanced over a predetermined time interval (time interval corresponding to the first time interval TD) in the detection optical fiber 12. As a result, the entire region in the longitudinal direction of the detection optical fiber 12 can be scanned over the sampling period by the plurality of optical pulses P1, P2, P3, . . . Pi, and the Rayleigh scattered lights from the regions in the longitudinal direction can be successively received, so that the Rayleigh scattered lights from the regions in the longitudinal direction do not overlap.

The first time interval TD in the present embodiment is a special time interval over the sampling period specified by the sound wave that is the detection object (period of time which is equal to or shorter than the half period of the sound wave)

Meanwhile, since the optical pulses Pi outputted over the first time interval TD are phase-modulated by mutually different (mutually independent) code sequences in the modulation unit 24, the optical pulse Pi by which the Rayleigh scattered light has been produced can be identified by demodulating the received Rayleigh scattered light.

Therefore, in the distributed optical fiber sound wave detection device 10, even when the long detection optical fiber 12 is used as a sensor and a sound wave of a high frequency (for example, with a short period as that ultrasound waves) is detected, the distribution of sound waves along the detection optical fiber 12 can be detected with good accuracy by outputting the optical pulses Pi with the first time interval TD.

Returning to FIG. 1, the first splitting unit 222 splits (branches) the optical pulse Pi outputted from the light source 220, while maintaining the linear polarization, and the split optical pulse Pi is outputted to the second splitting unit 224 and the Rayleigh scattered light reception unit 30 (more specifically, a digital coherent reception unit 320).

The second splitting unit 224 splits the optical pulse Pi from the first splitting unit 222 into a first optical pulse and a second optical pulse, while maintaining the linear polarization, and outputs the first optical pulse and second optical pulse (a pair of optical pulses) to the modulation unit 24. The second splitting unit 224 branches the inputted optical pulse at a ½ ratio (50:50) and outputs the branched pulses. The second splitting unit 224 of the present embodiment is a 3 dB splitting device (3 dB splitter).

The modulation unit 24 has a phase modulation unit 240 and a combining unit 242, performs phase modulation of the first optical pulse and second optical pulse outputted by the light source unit 22 (more specifically, the second splitting unit 224) and combines the phase-modulated first optical pulse and second optical pulse.

The phase modulation unit 240 has a first phase modulator 240a performing phase modulation of the first optical pulse, a second phase modulator 240b performing phase modulation of the second optical pulse, and a code generating unit 244 generating a pair of code sequences (pair codes: see FIG. 2) constituted by a first code sequence Ai and a second code sequence Bi.

The first phase modulator 240a performs phase modulation of the first optical pulse on the basis of the first code sequence Ai inputted from the code generating unit 244.

The second phase modulator 240b performs phase modulation of the second optical pulse on the basis of the second code sequence Bi inputted from the code generating unit 244.

The code generating unit 244 generates the pair codes constituted by the first code sequence Ai and the second code sequence Bi, as mentioned hereinabove, outputs the first code sequence Ai to the first phase modulator 240a, and outputs the second code sequence Bi to the second phase modulator 240b. The pair codes (the first code sequence Ai and the second code sequence Bi) generated by the code generating unit 244 each have a predetermined length (predetermined sequence length) based on the length dimension L of the detection optical fiber 12, and the first and second optical pulses are divided into a plurality of cells of a predetermined width d by phase-modulating the optical pulses by the respective pair codes (see FIGS. 5A and 5B). Thus, the optical pulses are each phase-modulated with a modulation rate d.

The width d of each cell is set on the basis of the longitudinal resolution of the detection optical fiber 12 in sound wave detection. This is described below in greater detail.

For example, when sound waves that have struck two points spaced in the longitudinal direction of the detection optical fiber 12 in the optical fiber 12 are detected, in order to detect independently the sound waves that have struck each point, the pulse width should be made shorter than the distance between the two points when a single pulse (optical pulse that is not divided into a plurality of cells) is used. Accordingly, where the optical pulse Pi is divided into a plurality of cells by phase modulation using the predetermined code sequence, each cell can act like an optical pulse with a small pulse width. Accordingly, the width (cell width) d of each cell is set shorter than the target longitudinal resolution.

Further, by so dividing each optical pulse into a plurality of cells with a width d, it is also possible to detect a high-frequency sound wave. More specifically, in order to detect a high-frequency sound wave by using a single pulse, it is necessary to perform the measurements by using an optical pulse with a pulse width shorter than the distance traveled by the high-frequency sound wave over one period. In this case, where the optical pulse is divided into a plurality of cells with a width d, each cell can act like an optical pulse with a small pulse width, as mentioned hereinabove, therefore, it is possible to detect a sound wave with a high frequency such that can be detected by the optical pulse with a pulse width d (a high frequency corresponding to the width d of each cell).

In the distributed optical fiber sound wave detection device 10 of the present embodiment, the first and second optical pulses are phase-modulated by the code sequences (pair codes) such that the cells are formed which have the width d that has thus been set.

The code generating unit 244 of the present embodiment outputs a Golay code sequence. The code sequence outputted by the code generating unit 244 is not limited to the Golay code sequence. Thus, the code sequence outputted by the code generating unit may be pair codes such that the sum of auto-correlation functions is a δ-function, or a code such that the auto-correlation function is individually a δ-function. For example, it may be a code sequence base on pseudo-random numbers, such as an M sequence.

The code generating unit 244 generates different (independent) pair codes for each optical pulse Pi outputted from the light source unit 22. As a result, it is possible to identify the optical pulse Pi that has produced the Rayleigh scattered light returned from the detection optical fiber 12.

The combining unit 242 combines the first optical pulse and second optical pulse that have been phase-modulated by the phase modulation unit 240, into a single optical pulse Pi and outputs the combined optical pulse.

The combining unit 242 of the present embodiment has a pair of input terminals (a first input terminal 242a and a second input terminal 242b), and the pair of input terminals 242a, 242b are designated such that the polarization directions of the inputted lights become mutually orthogonal. That is, the combining unit 242 of the present embodiment combines and outputs the first optical pulse and the second optical pulse in a state in which the polarization directions thereof are mutually orthogonal. In the explanation below, the first optical pulse inputted to the first input terminal 242a is also referred to as a P-polarized pulse, and the second optical pulse inputted to the second input terminal 242b is also referred to as a S-polarized puled.

The optical path connecting components from the light source 220 to the combining unit 242 is constituted by a polarization-maintaining optical fiber (PM fiber) or a waveguide in which the polarization state is maintained. As a result, the optical pulse Pi outputted as a linearly polarized light from the light source 220 maintains the polarization state thereof even after splitting in the second splitting unit 224. Therefore, the pair of optical pulses (first and second optical pulses) inputted to the combining unit 242 are in a state in which the polarization directions thereof are mutually orthogonal when the polarization-maintaining optical fiber connecting the second splitting unit 224 with the first input terminal 242a and the polarization-maintaining optical fiber connecting the second splitting unit 224 with the second input terminal 242b are connected to the input terminals 242a, 242b of the combining unit 242 in a manner such that the polarization directions of the optical pulses are mutually orthogonal.

The phase measurement unit 50 measures the phase of the optical pulse Pi outputted by the light source 220 and detects a phase variation (variation in phase with time) caused by the light source 220 in the optical pulse. The phase measurement unit 50 is connected to an optical fiber (waveguide) extending from the light source 220 and a demodulation unit 324 and outputs the phase signal corresponding to the measurement result to the demodulation unit 324. The demodulation unit 324 performs correction on the basis of the phase signal. As a result, the effect of phase variation caused by the light source 220 can be removed from the demodulated signal.

Figure 3:
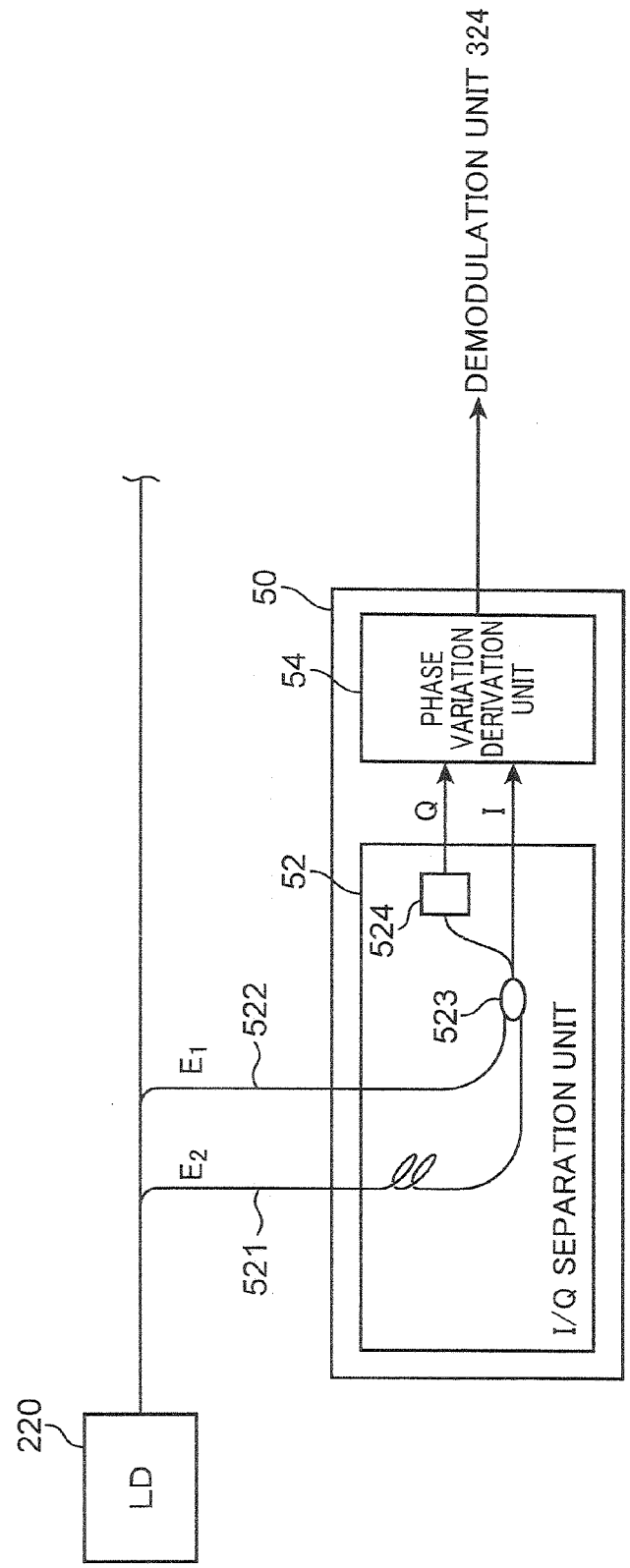
FIG. 3 is an explanatory drawing illustrating the phase measurement unit of the distributed optical fiber sound wave detection device.

More specifically, as also shown in FIG. 3, the phase measurement unit 50 is provided with an I/Q separation unit 52 and a phase variation derivation unit 54.

The I/Q separation unit 52 has two optical waveguides 521, 522 branched off from the optical fiber (optical waveguide) extending from the light source 220, an optical coupler 523, and a 90° phase shifter 524 and performs the I/Q separation of the light (optical pulse) outputted from the light source 220.

The optical waveguides 521, 522 branch off part of the light propagating in the optical fiber (optical waveguide) extending from the light source 220 and guide this part of the light to the optical coupler 523. The optical path length of the optical waveguide 521 is different from that of the optical waveguide 522. More specifically, the optical path length E2 of the optical waveguide 521 is longer by τ (more specifically, by the distance traveled by the optical pulse over the time interval τ) than the optical path length E1 of the optical waveguide 522.

The optical coupler 523 causes the interference of light guided by the optical waveguide 521 with that guided by the optical waveguide 522 and outputs the interference light. In this case, since the optical path length of the optical waveguide 521 is different from that of the optical waveguide 522, the light guided by the optical waveguide 521 reaches the optical coupler 523 with a delay by the time τ with respect to the light guided by the optical waveguide 522. The optical coupler 523 divides the interference light into two and outputs the divided light to the phase variation derivation unit 54.

The 90° phase shifter 524 shifts by 90° the phase of one light divided by the optical coupler 523.

The below-described I, Q signals are outputted from the aforementioned I/Q separation unit 52.

[Math. 1]

$$Q=\sqrt{E_1 E_2}\cdot\sin(\phi(t+\tau)-\phi(t)) \quad (1\text{-}1)$$

$$I=\sqrt{E_1 E_2}\cdot\cos(\phi(t+\tau)-\phi(t)) \quad (1\text{-}1)$$

The phase variation derivation unit 54 performs the A/D conversion of the I, Q signals from the I/Q separation unit 52, combines the converted signals and determines the phase φ(t) of the light outputted from the light source 220. More specifically, the phase variation derivation unit 54 determines the light phase φ(t) from the following Eq. (2).

[Math. 2]

$$\phi(t) = \arctan\left(\frac{Q}{I}\right) \quad (2)$$

Further, the phase variation derivation unit 54 can determine a phase variation rate at each point of time by taking the derivative (dφ(t)/dt) of the phase φ(t) determined by Eq. (2) with respect to time.

The phase variation derivation unit 54 outputs the phase variation (phase variation of the optical pulse caused by the light source 220) φ(t) of the light outputted from the light source 220, which has been determined in the above-described manner, as a phase signal.

The specific configuration of the phase measurement unit 50 is not limited to that described hereinabove. Thus, the phase measurement unit 50 may have another configuration, provided that the phase variation of the optical pulse Pi caused by the light source 220 can be detected.

In the phase measurement unit 50, the optical fibers and waveguides constituting the optical paths (optical waveguides 521, 522) from the optical fiber extending from the light source 220 to the phase variation derivation unit 54 also have a polarization maintaining characteristic. That is, the polarization direction of the light branched off from the optical fiber extending from the light source 220 is maintained as far as the phase variation derivation unit 54.

The optical circulator 14 is a non-reversible optical component in which the incident light and emitted light have a circulation relationship in the terminal numbers thereof. Thus, the light incident upon the first terminal 14a is emitted from the second terminal 14b and is not emitted from the third terminal 14c. The light incident on the second terminal 14b is emitted from the third terminal 14c and is not emitted from the first terminal 14a. The light incident of the third terminal 14c is emitted from the first terminal 14a and is not emitted from the second terminal 14b. The first terminal 14a of the optical circulator 14 is connected to the optical pulse emission unit 20, the second terminal 14b is connected to the first end section 12a of the detection optical fiber 12, and the third terminal 14c is connected to the Rayleigh scattered light reception unit 30.

The Rayleigh scattered light reception unit 30 has a phase variation derivation unit 32 and a sound wave detection unit 34 and receives the Rayleigh scattered light produced inside the detection optical fiber 12 by the injection of the optical pulse (optical pulse in which a P-polarized pulse is combined with an S-polarized pulse) Pi.

The phase variation derivation unit 32 has a digital coherent reception unit (separation-detection unit) 320, a digital signal processing unit 322, a demodulation unit 324, and a derivation unit 36 and determines the phase variation of the Rayleigh scattered light from the Rayleigh scattered light subjected to demodulation corresponding to the phase modulation in the optical pulse emission unit 20.

The digital coherent reception unit 320 is connected to the detection optical fiber 12 (more specifically, the third terminal 14c of the optical circulator 14) and the light source unit 22 (more specifically, the first splitting unit 224), performs separation of the orthogonal polarization component (P/S polarization in the present embodiment) and the orthogonal phase component (I/Q channel) of the Rayleigh scattered light from the detection optical fiber 12, and outputs the separated components as electrical signals.

The digital coherent reception unit 320 has a polarization duplexer 320a, a brancher 320b, a first optical 90° hybrid 321a, and a second optical 90° hybrid 321b.

The polarization duplexer 320a separates (polarization separation) the Rayleigh scattered light received by the Rayleigh scattered light reception unit 30 from the detection optical fiber 12 into the first Rayleigh scattered light with a predetermined polarization direction (also referred to hereinbelow simply as "P-polarized scattered light") and the second Rayleigh scattered light with a polarization direction orthogonal to that of the first Rayleigh scattered light (also referred to hereinbelow simply as "S-polarized scattered light").

The brancher 320b branches the optical pulse Pi from the first splitting unit 222 into two optical pulses (optical pulses Pi1, Pi2).

The first optical 90° hybrid 321a separates the optical pulse Pi1, which has been divided by the brancher 320b, as local light (local oscillation light) into an I component and a Q component by interference with the P-polarized scattered light from the polarization duplexer 320a, converts the separated components into I, Q signals (analog signals), and outputs the converted signals.

The second optical 90° hybrid 321b separates the optical pulse P12, which has been divided by the brancher 320b, as local light (local oscillation light) into an I component and a Q component by interference with the S-polarized scattered light from the polarization duplexer 320a, converts the separated components into I, Q signals (analog signals), and outputs the converted signals.

Figure 4:
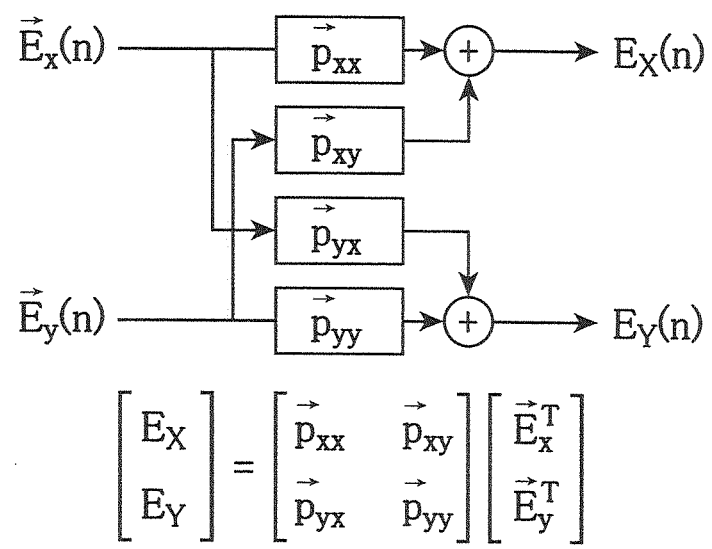
FIG. 4 shows the circuitry of the digital signal processing unit of the distributed optical fiber sound wave detection device.
Figure 5A:
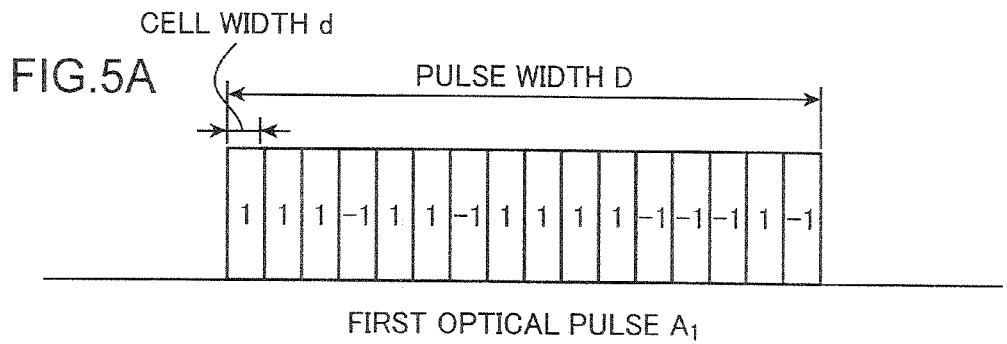
FIGS. 5A to 5D are conceptual diagrams for explaining the modulated optical pulse and a pulse compression restoration filter for demodulating the optical pulse.
Figure 5B:
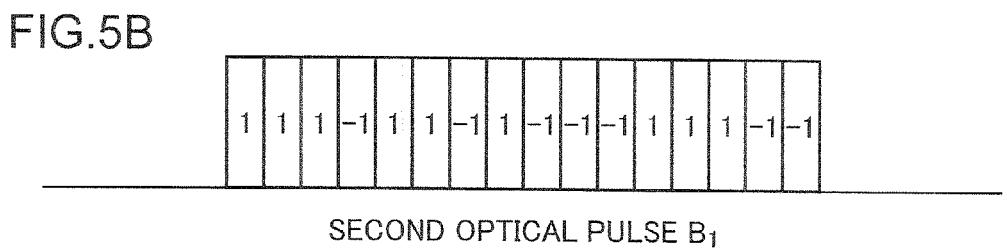
Figure 5C:
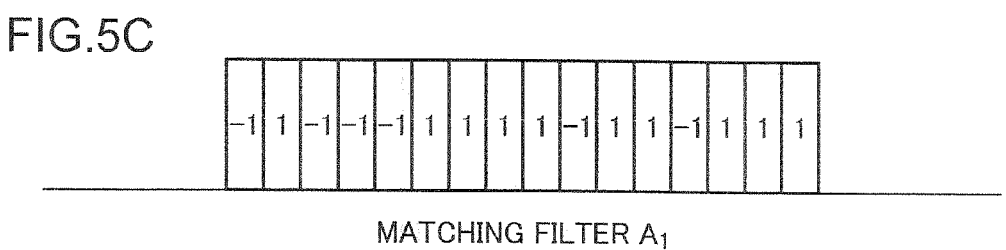
Figure 5D:
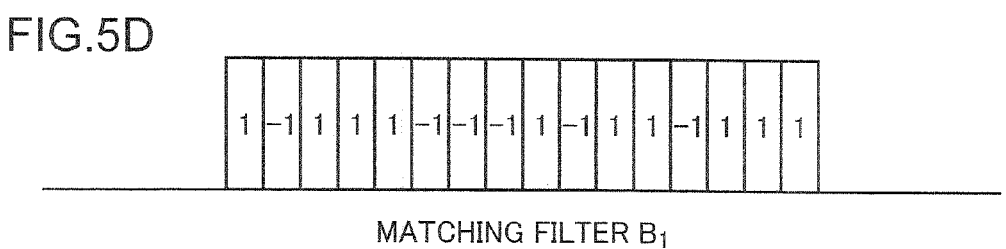

The digital signal processing unit 322 performs A/D conversion of the I, Q signals (analog signals) of each polarized scattered light (P-polarized scattered light and S-polarized scattered light) outputted from the digital coherent reception unit 320, then allows the converted signals to pass through the circuit shown in FIG. 4, and outputs an I, Q signal (also referred to hereinbelow simply as "P-polarized digital signal") of the P-polarized scattered light corresponding to the first optical pulse and an I, Q signal (also referred to hereinbelow simply as "S-polarized digital signal") of the S-polarized scattered light corresponding to the second optical pulse. More specifically, the digital signal processing unit 322 determines in the circuit the matrix shown therebelow in FIG. 4, uses the matrix to separate the Rayleigh scattered light generated inside the detection optical fiber 12 by the optical pulse (the optical pulse obtained by combining the phase-modulated first and second optical pulses) Pi outputted from the optical pulse emission unit 20 into the P-polarized digital signal corresponding to the first optical pulse and the S-polarized digital signal corresponding to the second optical pulse, and outputs the separated signals.

In the present embodiment, a DP-QPSK (Dual Polarization Quadrature Phase Shift Keying) reception module is used as the digital coherent reception unit 320 and the digital signal processing unit 322.

In the distributed optical fiber sound wave detection device 10 of the present embodiment, high-speed optical transmission with a rate equal to or higher than 40 Gbit/s is performed. Therefore, the resolution of the A/D conversion in the digital signal processing unit 322 is only 6 bit. However, in the distributed optical fiber sound wave detection device 10, the accuracy same as that in the case of 18-bit (=6+12) resolution is obtained by splitting the optical pulse Pi by phase modulation using the Golay code succession, forming 212 cells, and aggregating them into a signal optical pulse Pi during demodulation. That is, since strain information on the site in the detection optical fiber 12 where the Rayleigh scattered light has been produced is included (provided) in each cell of the Rayleigh scattered light, the aforementioned accuracy can be obtained by aggregating the cells by demodulation. Thus, highly accurate sound wave detection is realized by performing pulse compression using a code sequence such as in the distributed optical fiber sound wave detection device 10 even when the resolution of A/D conversion in the digital signal processing unit 322 is low.

The demodulation unit 324 performs correction based on the phase signal from the phase measurement unit 50 with respect to the P-polarized digital signal and S-polarized digital signal that have been polarization-divided by the digital coherent reception unit 320 and digital signal processing unit 322, and then performs the demodulation corresponding to phase modulation in the modulation unit 24.

The demodulation unit 324 has a first demodulation unit 324a and a second demodulation unit 324b. The first demodulation unit 324a and the second demodulation unit 324b are connected to the code generating unit 244.

The first demodulation unit 324a performs correction based on the phase signal from the phase measurement unit 50 with respect to the P-polarized digital signal outputted from the digital signal processing unit 322. The phase signal is obtained by measuring phase variations caused by the light source in the optical pulse Pi corresponding to the P-polarized digital signal which is the object of correction.

More specifically, where the P-polarized digital signal (digital signal corresponding to the P-polarized scattered light produced inside the detection optical fiber 12 by the first optical pulse that has been phase-modulated by the first code sequence $A_i$) is denoted by $A_i'$, the first demodulation unit 324a performs the correction represented by the following Eq. (3).

[Math. 3]

$$A_1' = e^{-\phi(t)} \quad (3)$$

Thus, the first demodulation unit 324a corrects the P-polarized digital signal by substituting $\phi(t)$ determined in the phase measurement unit 50 into "$\phi(t)$" of $-i\phi(t)$ to the right of e in Eq. (3). As a result, the effect of the phase variation caused by the light source 220 is removed from the P-polarized digital signal.

Likewise, the second demodulation unit 324b performs correction (correction represented by Eq. (4) below) based on the phase signal (phase signal used for correcting the P-polarized digital signal in the aforementioned first demodulation unit 324a) from the phase measurement unit 50 with respect to an S-polarized digital signal $B_i'$ outputted from the digital signal processing unit 322.

[Math. 4]

$$B_1' = B_1 e^{-i\phi(t)} \quad (4)$$

The first demodulation unit 324a then performs demodulation based on the code (first code sequence Ai) used when the first optical pulse has been phase-modulated by the modulation unit 24 with respect to the corrected P-polarized digital signal. Further, the second demodulation unit 324b performs demodulation based on the code (second code sequence Bi) used when the second optical pulse has been phase-modulated by the modulation unit 24 with respect to the corrected S-polarized digital signal.

For example, where the code sequence length is 16 and the first code sequence $A_1$ and the second code sequence Bi are represented by $A_1$=(1, 1, 1, −1, 1, 1, −1, 1, 1, 1, 1, −1, 1, −1, 1, −1) and
$B_1$=(1, 1, 1, −1, 1, 1, −1, 1, −1, −1, −1, 1, 1, 1, −1, 1), respectively (see FIGS. 5A and 5B), the first optical pulse is phase-modulated on the basis of the aforementioned first code sequence $A_1$ in the first phase modulator 240a, and the second optical pulse is phase-modulated on the basis of the aforementioned second code sequence Bi in the second phase modulator 240b. Here, the symbols 1, −1 correspond to 0, π in the phase modulation.

In this case, in the first demodulation unit 324a, the demodulation of the P-polarized digital signal corresponding to the first optical pulse is performed by the code (pulse compression restoration matching filter) $A_1^*$ corresponding to the first code sequence $A_1$. More specifically, in the first demodulation unit 324a, the demodulation is performed by an $A_1' \cdot A_1^*$ operation. Further, in the second demodulation unit 324b, the demodulation of the P-polarized digital signal corresponding to the second optical pulse is performed by a code (pulse compression restoration matching filter) $B_1^*$ corresponding to the second code sequence Bi. More specifically, in the second demodulation unit 324b, the demodulation is performed by a $B_1' \cdot B_1^*$ operation. Here, $A_1^*$ and $B_1^*$ are obtained by reversing the order of symbols in $A_1$ and $B_1$ (see FIGS. 5C and 5D) and represented by:

$A_1^*$=(−1, 1, −1, −1, −1, 1, 1, 1, 1, −1, 1, 1, −1, 1, 1, 1) and
$B_1^*$=(1, −1, 1, 1, 1, −1, −1, −1, 1, −1, 1, 1, −1, 1, 1, 1).

The derivation unit 36 is provided with a pair combining unit 360, a phase derivation unit 362, and a phase variation derivation unit 364 and determines a phase variation ΔΦ in the demodulated Rayleigh scattered light.

The pair combining unit 360 determines a sum of (combines) the P-polarized scattered light and S-polarized scattered light that have been demodulated by the demodulation unit 324 and determines the demodulated signal. More specifically, the pair combining unit 360 combines the P-polarized digital signal (I, Q signal: signal corresponding to the P-polarized scattered light) demodulated by the first demodulation unit 324a and the S-polarized digital signal (I, Q signal: signal corresponding to the S-polarized scattered light) demodulated by the second demodulation unit 324b. Even more specifically, in the pair combining unit 360, the demodulated signal (I, Q signal) is generated by determining the sum of I components (signals) and the sum of Q components (signals) of each signal when combining the P-polarized digital signal demodulated by the first demodulation unit 324a and the S-polarized digital signal demodulated by the second demodulation unit 324b.

As a result of such demodulation, that is, of determining the sum of signals after the demodulation of the P-polarized scattered light and S-polarized scattered light, the P-polarized scattered light and S-polarized scattered light that have each been divided into a plurality of cells are returned to a single optical pulse (single pulse). In this case, the strain information on the site in the detection optical fiber 12 where the Rayleigh scattered light (the P-polarized scattered light and the S-polarized scattered light) has been produced, which is included in each cell (each cell of the P-polarized scattered light and each cell of the S-polarized scattered light), is aggregated into a single pulse with a pulse width of one cell (optical pulse that has not been divided into a plurality of cells). Thus, in the distributed optical fiber sound wave detection device 10 of the present embodiment, the demodulation (that is, pulse compression using the predetermined code sequence) of the Rayleigh scattered light produced inside the detection optical fiber 12 by the optical pulse Pi demonstrates the same effect as the detection of sound wave by using an optical pulse having a small pulse width (pulse width corresponding to the cell width d) and a high signal strength.

The phase derivation unit 362 determines the phase $\Phi$ of the Rayleigh scattered light received by the Rayleigh scattered light reception unit 30 from the demodulated signal obtained in the pair combining unit 360. More specifically, the phase derivation unit 362 determines the phase $\Phi$ of the Rayleigh scattered light by Eq. (5) below from the demodulated signal (I, Q signal) determined by the pair combining unit 360.

[Math. 5]

$$\Phi = \arctan\left(\frac{Q}{I}\right) \quad (5)$$

The phase derivation unit 362 outputs the phase $\Phi$ of the Rayleigh scattered light determined in the above-described manner to the phase variation derivation unit 364 and also stores this phase in a storage unit 16a of the control processing unit 16.

The phase variation derivation unit 364 determines the difference (phase variation) $\Delta\Phi$ between the phase of the Rayleigh scattered light that has been recently determined in the phase derivation unit 362 and the phase of the Rayleigh scattered light determined in the previous cycle. For example, when the sound wave is detected at timings t1, t2, t3, . . . , ti by the distributed optical fiber sound wave detection device 10, the phase variation deviation unit 364 determines, as the phase variation $\Delta\Phi$, the difference between the phase $\Phi_i$ of the Rayleigh scattered light determined at the timing $t_i$ and the phase $\Phi_{i-1}$ of the Rayleigh scattered light determined at the timing $t_{i-1}$. More specifically, the phase variation derivation unit 364 receives the phase $\Phi_i$ of the Rayleigh scattered light from the phase derivation unit 362, reads the phase $\Phi_{i-1}$ of the Rayleigh scattered light determined in the previous cycle and stored by the phase derivation unit 362 in the storage unit 16a, and determines therefrom the phase variation $\Delta\Phi$ ($=\Phi_i-\Phi_{i-1}$) between the Rayleigh scattered light determined in the previous cycle and the Rayleigh scattered light that has been determined thereafter.

Figure 6:
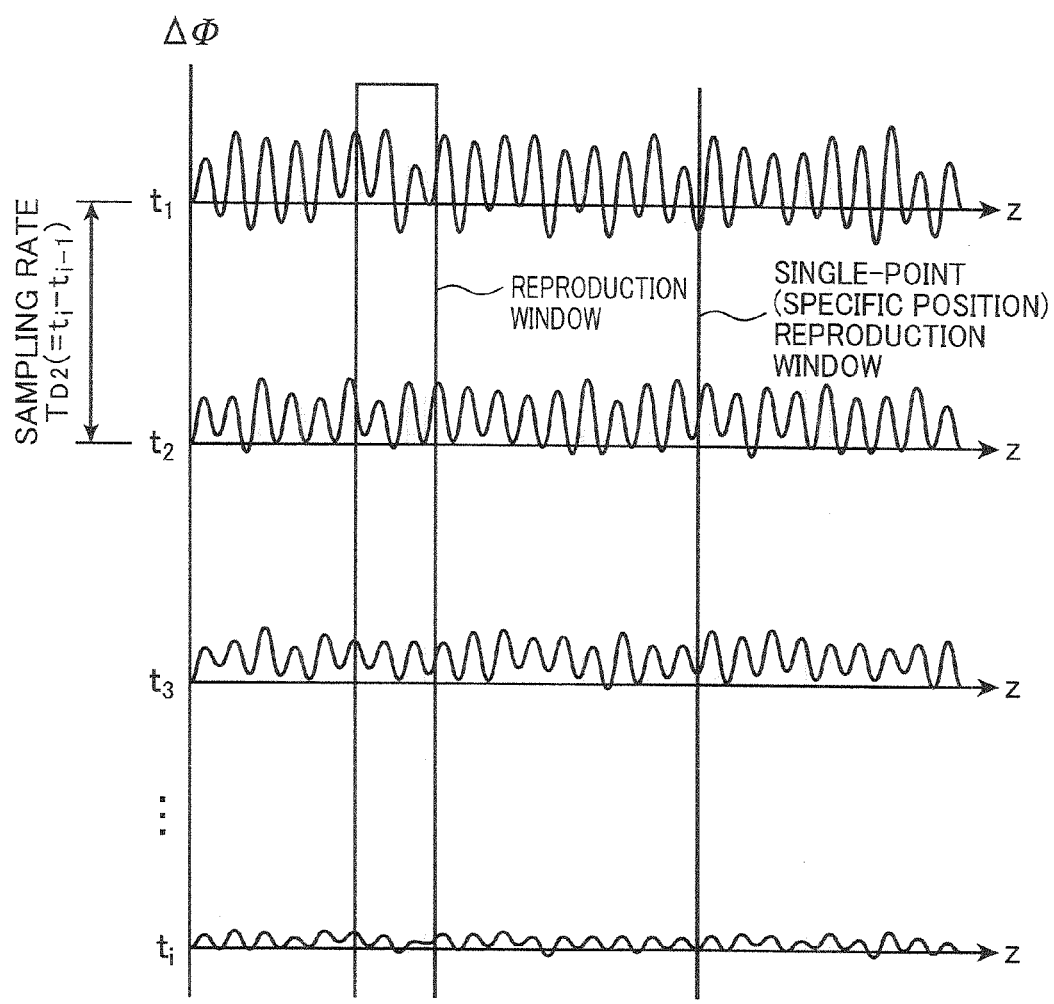
FIG. 6 shows distribution data on phase variation of Rayleigh scattered light along the longitudinal direction of a detection optical fiber.

The sound wave detection unit 34 creates data (distribution data on phase variation $\Delta\Phi$ along the z axis) at each position in the z-axis direction (longitudinal direction of the detection optical fiber 12) for each timing $t_1$, $t_2$, $t_3$, . . . , $t_i$ such as shown in FIG. 6, from the size of the phase variation $\Delta\Phi$ in the Rayleigh scattered light outputted from the phase variation derivation unit 364, and stores the distribution data on phase variation $\Delta\Phi$ in the storage unit 16a. In the present embodiment, the interval $T_{D2}$ of the timings $t_1$, $t_2$, $t_3$, . . . is also referred to as a sampling rate.

The sound wave detection unit 34 specifies the generation position, in the longitudinal direction, of the Rayleigh scattered light in which the phase variation $\Delta\Phi$ has occurred by the interval of time from when the optical pulse Pi has been outputted from the optical pulse emission unit 20 till when the Rayleigh scattered light produced by the optical pulse Pi is received by the Rayleigh scattered light reception unit 30. The size of the phase variation $\Delta\Phi$ of the Rayleigh scattered light at each position in the longitudinal direction represents the sound wave that has struck those positions of the detection optical fiber 12 from the outside.

The control processing unit 16 is a unit for controlling each component of the distributed optical fiber sound wave detection device 10 and includes, for example, a microprocessor, a working memory, and the storage unit 16a or other memory for storing necessary data.

The control processing unit 16 performs computational processing of various data (distribution of the phase variation $\Delta\Phi$ and the like) that have been determined by the source wave detection unit 34 and stored in the storage unit 16a and determines various types of information relating to the sound wave that has struck the detection optical fiber 12. For example, the control processing unit 16 can specify the position of the transmission source of the sound wave from the distribution of the phase variation $\Delta\Phi$ along the longitudinal direction. Further, the control processing unit 16 can detect the movement of the position of the sound wave transmission source with the passage of time (t1, t2, t3, . . . , ti) from variations in time of the distribution of the phase variation $\Delta\Phi$ along the longitudinal direction.

The output unit 40 has a display unit 42 and a speaker unit 44. The output unit 40 outputs to the outside various types of information on the sound waves detected at each position, in the longitudinal direction, on the basis of the distribution of the phase variation $\Delta\Phi$ stored in the storage unit 16a by the sound wave detection unit 34. More specifically, the output unit 40 displays, with the display unit 42, a graph having three axes, namely, an axis (z axis) representing the distance in the longitudinal direction of the detection optical fiber 12, an axis representing the elapsed time, and an axis representing the intensity of the detected sound wave, or the positions of the sound wave generation source, which have been determined by the control processing unit 16, for example. The output unit 40 also outputs (reproduces) with the speaker unit 44 the sound wave detected at a random position in the longitudinal direction of the detection optical fiber 12.

When the detected sound wave is reproduced, the output unit 40 sets a reproduction window (see FIG. 6) at a predetermined position on the z axis in the distribution data of the phase variation $\Delta\Phi$ stored in the storage unit 16a, and reproduces the variation of the phase variation $\Delta\Phi$ in the reproduction window with time at timings (t1, t2, t3, . . . , ti) as the variation of sound ($\approx$voltage).

The reproduction window is usually set on a straight line connecting specific positions on the z axis (longitudinal direction of the detection optical fiber 12) for each timing t1, t2, t3, . . . , as shown by a single-point reproduction window in FIG. 6. The sound that has struck at the specific positions is reproduced in the order of elapsed time t1, t2, t3, . . . , as a result of setting such a reproduction window. The reproduction window is not limited to that set on the straight line. For example, a reproduction window having a predetermined width in the z-axis direction (the reproduction window shown on the left side of the single-point reproduction window in FIG. 6) may be also set. In this case, sound waves of a plurality of frequencies are reproduced at each timing t1, t2, t3, . . . in a mixed state.

Figure 7:
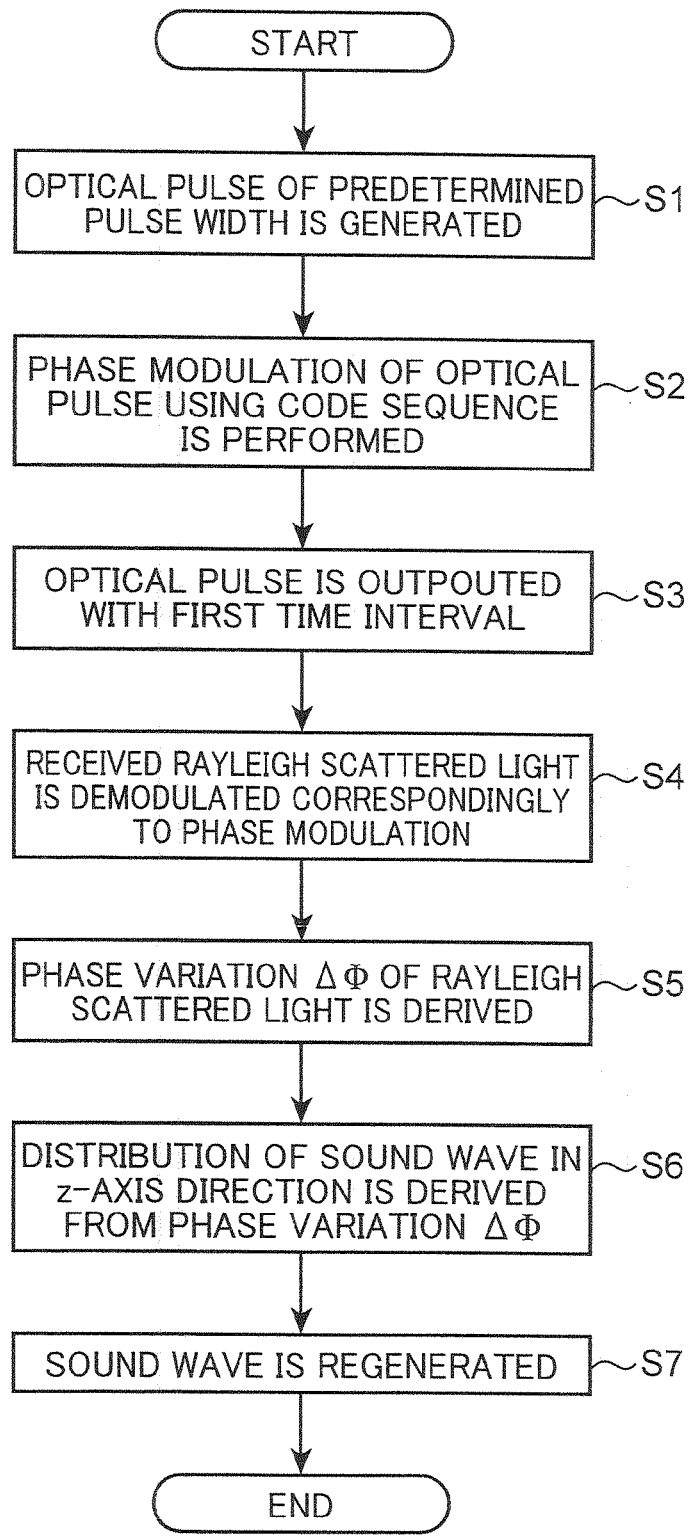
FIG. 7 shows a processing flow during sound wave detection.

In the above-described distributed optical fiber sound wave detection device 10, the detection of sound waves is performed as shown in FIG. 7. This detection is explained below in greater detail.

First, the detection optical fiber 12 is installed. The detection optical fiber 12 may be suspended in the air, or may be disposed in the ground, in the walls of the buildings or the like, or at the surface of structural components such as walls or vehicles such as aircrafts. The detection optical fiber 12 may be also wound on a human body.

When the detection optical fiber 12 is suspended in the air, a sound wave that has propagated in the air and reached the detection optical fiber 12 can be detected. When the detection optical fiber is disposed in the ground, in the walls of the buildings or the like, or at the surface of structural components such as walls or vehicles such as aircrafts, a sound wave that has propagated in the ground or members constituting the vehicle or structure and reached the detection optical fiber 12 can be detected. Further, an optical fiber that has already been installed for communication in the building may be used as the detection optical fiber 12. In this case, a sound wave (source) generated in the room successively propagates through the air in the room and the walls and reaches the detection optical fiber (optical fiber that has already been installed for communication) 12, thereby making it possible to detect the sound wave. When the detection optical fiber 12 is wound on a human body, a sound wave (for example, an ultrasound wave) that has propagated in the human body and reached the detection optical fiber can be detected.

Once the detection optical fiber 12 has been installed, the control processing unit 16 outputs the phase-modulated optical pulses Pi with the first time interval TD from the optical pulse emission unit 20 and inputs the optical pulses to the detection optical fiber 12 via the optical circulator 14. This will be described below in greater detail.

The light source unit 22 outputs linearly polarized optical pulses Pi having a predetermined pulse width D (step S1). The optical pulses Pi are successively outputted with the first time interval TD that has been set on the basis of the period of the sound (when there is a predetermined frequency band, the sound with the highest frequency) that is the detection object.

The optical pulse Pi is split into a pair of optical pulses (first optical pulse and second optical pulse) by the second splitting unit 224, and the split optical pulses are supplied to the modulation unit 24. In the modulation unit 24, the phase modulators 240a, 240b perform phase modulation with respect to the corresponding optical pulses of the optical pulse pair (a pair of optical pulses split in the second splitting unit 224) by using the pair codes (first code sequence Ai and second code sequence Bi) generated by the code generating unit 244 (step S2). Thus, the first phase modulator 240a performs phase modulation of the first optical pulse by using the first code sequence Ai, and the second phase modulator 240b performs phase modulation of the second optical pulse by using the second code sequence Bi. As a result, each optical pulse is divided into a plurality of cells.

The pair of optical pulses that has been phase-modulated by the phase modulators 240a, 240b is combined in the combining unit 242 in a state with mutually orthogonal polarization directions, and the combined optical pulse Pi is outputted from the optical pulse emission unit 20 with the first time interval TD (step S3). This optical pulse Pi is inputted from the first end section 12a into the detection optical fiber 12 via the optical circulator 14. As a result, a plurality of optical pulses P1, P2, P3, . . . , Pi propagates inside the detection optical fiber 12 towards the second end section 12b with the first time interval TD (see FIG. 2).

In this case, for example, when a sound wave propagating in a solid body is detected, where the velocity of the sound wave in the solid body is 5000 m/s and the frequency of the sound wave that is the detection object is 20 kHz, one period of the sound wave is 50 µs, and the sampling period is, for example, 25 µs (the sampling period may be equal to or less than this value). The distance traveled by the optical pulse Pi in the optical fiber over the sampling period is 5 km. Therefore, the first time interval TD is set to 25 µs (may be equal to or less than this value). In this case, where the total length L of the detection optical fiber 12 is 10 km, the distance traveled by the optical pulse Pi in both directions is 20 km. Therefore, four (4) optical pulses travel back and forth inside the optical fiber 12 with the first time interval TD (interval of 25 µs or 5 km).

Further, for example, where the frequency of the sound wave that is the detection object is 10 MHz, one period of the sound wave is 0.1 µs (=100 ns), and the sampling frequency is, for example, 50 ns (the sampling period may be equal to or less than this value). The distance traveled by the optical pulse Pi inside the optical fiber over this sampling period is 10 m. Therefore, the first time interval TD is set to 50 ns (may be equal to or less than this value). In this case, where the total length L of the detection optical fiber 12 is 100 m, the distance traveled by the optical pulse Pi in both directions is 200 m. Therefore, twenty (20) optical pulses travel back and forth inside the optical fiber 12 with the first time interval TD (interval of 50 ns or 10 m).

Where the optical pulse Pi is thus inputted to the detection optical fiber 12, the control processing unit 16 then detects a sound wave that has struck the detection optical fiber 12 from the Rayleigh scattered light received by the Rayleigh scattered light reception unit 30. This is described below in greater detail.

Where the sound wave reaches (strikes) the detection optical fiber 12, strains caused by the strike of the sound wave are generated in the optical fiber 12. The strains are in the longitudinal direction (central axis (tangential) direction of the detection optical fiber 12 at the position where the sound wave has struck) of the detection optical fiber 12. Where the Rayleigh scattered light is produced at the position where the strains have occurred, the phase of the Rayleigh scattered light changes with respect to that of the Rayleigh scattered light produced at the same position when no strain have occurred. The amount of phase variation $\Delta\Phi$ corresponds to the intensity or frequency of the sound wave that has struck the detection optical fiber 12. Accordingly, the Rayleigh scattered light reception unit 30 detects the phase variation $\Delta\Phi$ (information on strains) of the Rayleigh scattered light caused by the sound wave striking the detection optical fiber 12 from the Rayleigh scattered light that has returned to the first end section 12a of the detection optical fiber 12, and performs the detection of the sound wave that has struck the detection optical fiber 12 from the phase variation $\Delta\Phi$. Thus, the Rayleigh scattered light generated by the optical pulse Pi to be incident into the detection optical fiber 12 is received, and the information on strains generated in the detection optical fiber 12 by the striking sound wave is acquired from the Rayleigh scattered light.

More specifically, initially the digital coherent reception unit 320 separates the orthogonal polarization component (P/S polarization) and orthogonal phase component (I/Q channel) of the received Rayleigh scattered light. Then, the digital signal processing unit 322 performs A/D conversion and then generates and outputs the P-polarized digital signal corresponding to the first optical pulse and the S-polarized digital signal corresponding to the second optical pulse by the circuit shown in FIG. 4. The first demodulation unit 324a (second demodulation unit 324b) performs demodulation ($A_i' \cdot A_1^*$ and $Bi' \cdot B_1^*$) corresponding to the phase modulation in the first phase modulator 240a (second phase modulator 240b) with respect to the P-polarized digital signal (S-polarized digital signal) (step S4).

Where the P-polarized digital signal and S-polarized digital signal are demodulated, the pair combining unit 360 finds a sum of the P-polarized scattered light (signal corresponding to the P-polarized scattered light) and S-polarized scattered light (signal corresponding to the S-polarized scattered light), which have been determined by the demodulation, and takes the sum as the demodulated signal. As a result, the signal corresponding to the Rayleigh scattered light (optical pulse) divided into a plurality of cells by phase modulation becomes a signal corresponding to the single pulse (optical pulse that has not been divided into a plurality of cells) with a pulse width of one cell. In this case, when the optical pulse Pi inputted to the detection optical fiber 12 is reflected by refractive index fluctuations and Rayleigh scattered light is produced, since all of the cells constituting the optical pulse Pi are reflected by the fluctuation, each cell includes strain information on the reflection position. Therefore, by obtaining a single pulse (signal corresponding to the single pulse) by demodulation, it is possible to aggregate the strain information included in the cells. As a result, from a signal corresponding to one optical pulse (Rayleigh scattered light), it is possible to obtain strain information in an amount equivalent to that obtained when the optical pulses equal in number to the cells are outputted to the detection optical fiber 12.

Where the demodulated P-polarized digital signal and S-polarized digital signal are combined in the pair combining unit 360 and a demodulated signal is produced, the phase derivation unit 362 determines the phase of the Rayleigh scattered light corresponding to the demodulated signal from the demodulated signal. The phase variation derivation unit 364 then determines the phase variation (that is, the phase variation of the Rayleigh scattered light caused by the strains produced in the detection optical fiber 12 by the striking sound wave) $\Delta\Phi$ of the Rayleigh scattered light from the phase of the Rayleigh scattered light and the phase of the Rayleigh scattered light determined in the previous cycle in the phase derivation unit 362 (step S5). In the present embodiment, since the strains in the detection optical fiber 12 produced by the striking sound wave vary over a very short interval of time, the derivation unit 36 determines the phase variation $\Delta\Phi$ from the phase difference between the Rayleigh scattered light at the previous measurement time (for example, the timing t1 in FIG. 6) and the Rayleigh scattered light at the next measurement time (for example, the timing t2 in FIG. 6).

Where the phase variation $\Delta\Phi$ is thus determined, the sound wave detection unit 34 forms distribution data on the phase variation $\Delta\Phi$ in the z-axis direction (longitudinal direction) at each of the timings t1, t2, t3, . . . , ti and stores the distribution data in the storage unit 16a (step S6). The distribution of the phase variation $\Delta\Phi$ in the z-axis direction (longitudinal direction) is the distribution of sound waves that have struck at various position in the z-axis direction.

In this case, the distribution of sound waves in the z-axis direction (longitudinal direction) which can be detected (scanned) by one optical pulse Pi is within a range in which the optical pulse Pi can move back and forth inside the detection optical fiber 12 over the sampling period of the sound wave (sound wave that is the detection object), that is, over half of the period with the maximum frequency of the sound wave that is the detection object. By outputting a plurality of optical pulses P1, P2, P3, . . . , Pi from the optical pulse emission unit 20 with the first time interval TD, it is possible to scan the entire region in the z-axis direction (longitudinal direction) of the detection optical fiber 12 in the sampling period by the plurality of optical pulses P1, P2, P3, . . . , Pi.

Where the distribution of the phase variation $\Delta\Phi$ in the z-axis direction (longitudinal direction) (distribution of sound wave in the z-axis direction) is detected, the output unit 40 then converts the variation of the phase variation $\Delta\Phi$ with the passage of time (t1, t2, t3, . . . , ti) at a specific position (position on the z axis that specifies the reproduction window) in the z-axis direction (longitudinal direction), thereby reproducing the sound wave that has struck the detection optical fiber 12 at the specific position (step S7).

Further, the control processing unit 16 specifies the position of the transmission source of the sound wave from the distribution of the phase variation $\Delta\Phi$ in the z-axis direction (longitudinal direction) that has been stored in the storage unit 16a by the sound wave detection unit 34, and the output unit 40 displays this position on the display unit 42.

The control processing unit 16 can incorporate a program for reproducing the state in the ground or inside a structure from the distribution of the phase variation $\Delta\Phi$ in the z-axis direction. When the sound wave that propagates inside the ground or a structure is detected by the detection optical fiber 12, the control processing unit 16 executes the program, thereby making it possible to reproduce the state in the ground, or in the oil well, or inside the structure from the obtained distribution of the phase variation $\Delta\Phi$ in the z-axis direction (longitudinal direction), and the output unit 40 can display the corresponding information. Where the control processing unit 16 incorporates a program for reproducing the internal state of a human body from the distribution of the phase variation $\Delta\Phi$ in the z-axis direction (longitudinal direction), the sound wave propagating inside the human body is detected by the detection optical fiber 12, and by executing the program, the control processing unit 16 can detect the internal state of the human body from the obtained distribution of the phase variation $\Delta\Phi$ in the z-axis direction (longitudinal direction), and the output unit 40 can display this state as an image.

With the above-described distributed optical fiber sound wave detection device 10, where the optical pulse Pi subjected to phase modulation by a predetermined code sequence is injected into the detection optical fiber 12 and the Rayleigh scattered light generated inside the detection optical fiber 12 by the optical pulse Pi is subjected to demodulation corresponding to the phase modulation (that is, pulse compression using the predetermined code sequence is performed), it is possible to obtain the same effect as that obtained when a sound wave is detected using an optical pulse of a small width (pulse width corresponding to the cell width d) and a high signal strength. As a result, the sound waves that have struck regions in the longitudinal direction (z-axis direction) of the long detection optical fiber 12 can be detected with high sensitivity and high accuracy and a high longitudinal resolution can be realized.

More specifically, by performing phase modulation of the optical pulse Pi by using a code sequence (in the present embodiment, the Golay code sequence) of a predetermined length (length based on the longitudinal size L of the detection optical fiber 12), it is possible to ensure energy sufficient for detecting the sound wave in the optical pulse Pi to be incident into the detection optical fiber 12. This is described hereinbelow in greater detail.

The pulse width D of the optical pulse Pi that is phase-modulated by a long code sequence increases with the length of the code sequence. Therefore, the optical pulse Pi phase-modulated by a long code sequence has larger energy. Accordingly, when the Rayleigh scattered light produced in the vicinity of the second end section 12b of the detection optical fiber 12 is received, the optical pulse Pi that has been phase-modulated by the code sequence of a length ensuring sufficient signal strength necessary for sound wave detection is used for sound wave detection. As a result, even when the Rayleigh scattered light produced at any position in the longitudinal direction of the long detection optical fiber 12 is received, this Rayleigh scattered light has a sufficient signal strength necessary for sound wave detection. Therefore, the sound waves that have struck at various regions in the longitudinal direction of the long detection optical fiber 12 can be detected with high sensitivity and high accuracy.

Further, where the optical pulse Pi is divided by phase modulation into a plurality of cells, when Rayleigh scattered light is produced by the optical pulse Pi inside the detection optical fiber 12, each cell of the Rayleigh scattered light includes (has) strain information on the site where the Rayleigh scattering has occurred. As a result, a large volume of strain information can be obtained by measurements using a single optical pulse Pi. Thus, since the strain information included in the cells is aggregated by demodulation of the received Rayleigh scattered light, it is possible to obtain strain information of the volume equivalent to that obtained by measuring strains at the site where the Rayleigh scattering has occurred by using a large number (number corresponding to the number of cells) of optical pulses. Thus, by performing pulse compression using a predetermined code sequence, it is possible to obtain a sufficient amount of strain information at the position of the detection optical fiber 12 where the Rayleigh scattered light has been produced from the Rayleigh scattered light produced by a single optical pulse Pi. As a result, even the strains that are produced in the detection optical fiber 12 by the striking sound wave and vary over a very short period of time, the strains can be detected with good accuracy.

Further, by dividing the optical pulse Pi by phase modulation into a plurality of cells of a predetermined width d, it is possible to obtain the longitudinal resolution same as that obtained when the measurements are performed using an optical pulse with a pulse width equal to the cell width d. Thus, by dividing the optical pulse Pi into cells corresponding in number to the code sequence of a predetermined length, it is possible to realize a high longitudinal resolution corresponding to the cell width, while ensuring sufficient energy of the optical pulse Pi and detecting a sound wave that has struck at a position far from the first end section 12a of the detection optical fiber 12.

When pulse compression using the code sequence such as in the present embodiment is performed, a sufficient amount of strain information is obtained on the site where the Rayleigh scattered light has been produced in the detection optical fiber 12 with a single optical pulse Pi. Therefore, it is not necessary to perform measurements by sweeping the frequency of the optical pulse Pi that is entered into the detection optical fiber 12. For this reason, with the distributed optical fiber sound wave detection device 10, the sound waves that have struck in each region in the longitudinal direction of the long detection optical fiber 12 can be detected with high sensitivity and high accuracy and a high longitudinal resolution can be realized even by using the light source unit 22, which is simpler in configuration than a light source unit outputting optical pulses with variable frequency, in the optical pulse emission unit 20.

Further, as a result of performing pulse compression using a pair of code sequences (for example, a Golay code sequence) such that the sum of the autocorrelation functions is a $\delta$-function, as in the present embodiment, when phase variations are determined from a pair of Rayleigh scattered lights (P-polarized scattered light and S-polarized scattered light) that have been separated and demodulated by the digital coherent reception unit 320, the digital signal processing unit 322, and the demodulation unit 324, it is possible to eliminate the effect of Rayleigh scattered light other than the pair of Rayleigh scattered lights. As a result, high-sensitivity and high-accuracy detection of sound waves can be performed more reliably.

Thus, where a Golay code sequence is used, the following conditions are fulfilled in FIG. 2:

$$Ai*Ai+Bi*Bi=2M\delta$$

$$Ai*Aj+Bi*Bj=0$$

Here, * represents a correlation operation, and M represent the length of the code sequence.

As a result, since the sum of autocorrelation functions of one Rayleigh scattered light in the aforementioned pair (for example, the P-polarized scattered light) and another Rayleigh scattered light becomes zero, the effect of Rayleigh scattered light other than the pair of Rayleigh scattered lights can be eliminated from the measurement result.

Further, in the distributed optical fiber sound wave detection device 10 of the present embodiment, the phase variation of the optical pulse $P_i$ caused by the light source 220 is detected by the phase measurement unit 50, and the received Rayleigh scattered light is corrected on the basis of the measurement result, which is obtained with the phase measurement unit 50, before the demodulation corresponding to the phase modulation in the modulation unit 24 is performed in the demodulation unit 324. As a result, the effect of phase variation of the Rayleigh scattered light after demodulation caused by the light source 220 can be inhibited. Therefore, in the distributed optical fiber sound wave detection device 10 of the present embodiment, the sound wave detection can be performed with good accuracy. This is described below in greater detail.

With some light sources, the phase of the outputted light beam (optical pulse) changes with the passage of time, and such phase variations are irregular. Therefore, where the received Rayleigh scattered light is directly demodulated when the light source 220 with a variable phase is used in the distributed optical fiber sound wave detection device 10, a state is assumed in which the demodulated Rayleigh scattered light includes the effect (phase noise) of phase variations caused by the light source 220. Accordingly, the phase noise is removed and the effect of the phase noise in the demodulated Rayleigh scattered light is inhibited by measuring the phase variation of the optical pulse Pi caused by the light source 220 and correcting the Rayleigh scattered light prior to demodulation on the basis of the measurement result, as in the distributed optical fiber sound wave detection device 10 of the present embodiment. As a result, sound waves can be accurately detected even when the light source 220 is used in which the phase of the outputted light beam varies with the passage of time.

Second Embodiment

Figure 8:
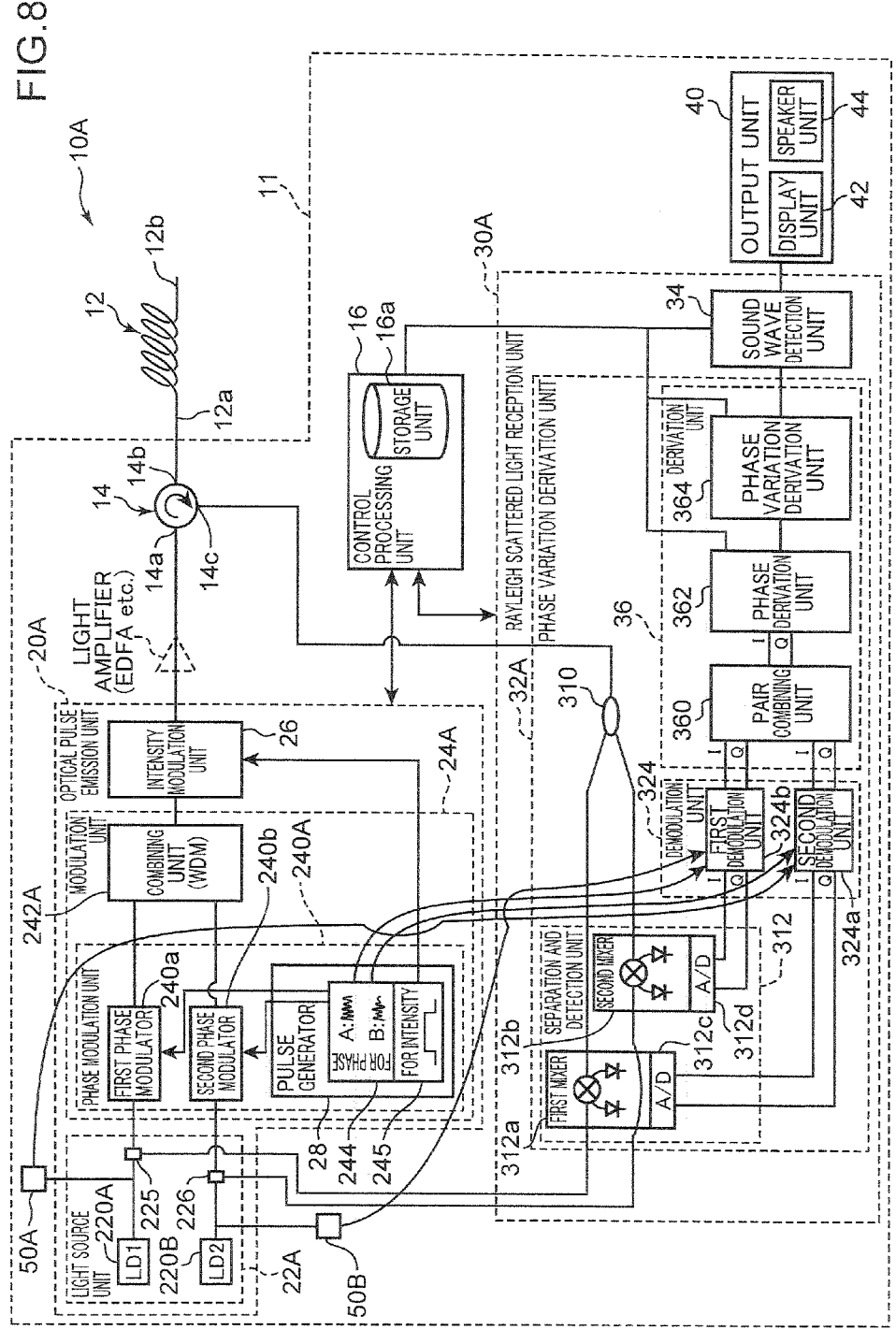
FIG. 8 is a functional block diagram showing the configuration of the distributed optical fiber sound wave detection device according to the second embodiment of the present invention.

The second embodiment of the present invention is explained below with reference to FIG. 8. The components same as in the first embodiment are assigned with same reference numerals and detailed explanation thereof is herein omitted. Only the different components are explained hereinbelow in detail.

A distributed optical fiber sound wave detection device 10A of the second embodiment is provided with the device main body 11 and the detection optical fiber 12. The device main body 11 is provided with an optical pulse emission unit 20A, phase measurement units 50A, 50B, the optical circulator 14, a Rayleigh scattered light reception unit 30A, the control processing unit 16, and the output unit 40.

In the distributed optical fiber sound wave detection device 10A of the present embodiment, an optical amplifier such as a erbium-doped optical fiber (EDFA) may be disposed between the optical pulse emission unit 20A and the optical circulator 14, in the same manner as in the first embodiment.

The optical pulse emission unit 20A is provided with a light source unit 22A that outputs an optical pulse of a predetermined frequency, a modulation unit 24A that performs phase modulation of the optical pulse Pi outputted by the light source unit 22A, and an intensity modulation unit 26. The optical pulse is entered from the first end section 12a of the detection optical fiber 12 into the detection optical fiber 12.

The light source unit 22A has a first light source 220A, a second light source 220B, a third splitting unit 225, and a fourth splitting unit 226. The first light source 220A outputs the first optical pulse with a specific wavelength $\lambda 1$. The second light source 220B outputs the second optical pulse with a wavelength $\lambda 2$ different from the wavelength $\lambda 1$. Thus, the first optical pulse and the second optical pulse have mutually different wavelengths $\lambda$.

The third splitting unit 225 splits (branches) the first optical pulse outputted from the first light source 220A, and the split first optical pulses are outputted to the modulation unit 24A and the Rayleigh scattered light reception unit 30A (more specifically, a first mixer 312a of a separation and detection unit 312). The fourth splitting unit 226 splits (branches) the second optical pulse outputted from the second light source 220B, and the split second optical pulses are outputted to the modulation unit 24A and the Rayleigh scattered light reception unit 30A (more specifically, a second mixer 312b of the separation and detection unit 312).

The modulation unit 24A has a phase modulation unit 240A and a combining unit 242A and phase modulates and combines the first optical pulse and second optical pulse outputted by the light source unit 22A (more specifically, the first light source 220A and the second light source 220B).

The phase modulation unit 240A has a first phase modulator 240a, a second phase modulator 240b, and a pulse generator 28 creating a pair of code sequences (pair codes: see FIG. 2) constituted by the first code sequence Ai and the second code sequence Bi.

The pulse generator 28 has a code generating unit 244 that generates pair codes to be used for phase modulation of the first optical pulse and second optical pulse, and an intensity modulation signal generating unit 245 that generates a signal (intensity signal) for intensity modulation of the combined optical pulse Pi.

The intensity modulation signal generating unit 245 is connected to the intensity modulation unit 26 and outputs the signal for intensity modulation with a pulse width D and pulse interval (first time interval) Td corresponding to the pair codes generated in the code generating unit 244 (see FIG. 2).

The combining unit 242A combines the first optical pulse and second optical pulse subjected to phase modulation in the phase modulation unit 240A, into a single optical pulse Pi and outputs the combined optical pulse. The combining unit 242A of the present embodiment combines the first optical pulse and second optical pulse into a single optical pulse Pi and outputs the combined optical pulse by using the wavelength division multiplex (WDM).

The intensity modulation unit 26 performs intensity modulation of the optical pulse Pi outputted from the combining unit 242A on the basis of the intensity modulation signal from the intensity modulation signal generating unit 245 of the pulse generator 28.

The optical pulse Pi with a pulse width D that has been divided into a plurality of cells with a width d is outputted from the above-described optical pulse emission unit 20A with the first time interval TD in the same manner as in the first embodiment.

The phase measurement unit (first phase measurement unit) 50A measures the phase of the first optical pulse outputted by the first light source 220A, detects a phase variation (variation in phase with time) caused by the first light source 220A in the first optical pulse, and outputs a phase signal corresponding to the measurement result towards the first demodulation unit 324a.

The phase measurement unit (second phase measurement unit) 50B measures the phase of the second optical pulse outputted by the second light second 220B, detects a phase variation (variation in phase with time) caused by the second light source 220B in the second optical pulse, and outputs a phase signal corresponding to the measurement result towards the second modulation unit 324b.

The Rayleigh scattered light reception unit 30A has a phase variation derivation unit 32A and the sound wave detection unit 34 and receives the Rayleigh scattered light produced inside the detection optical fiber 12 by the incidence of the optical pulse (optical pulse obtained by combining the first optical pulse and second optical pulse with mutually different waveforms) Pi. The phase variation derivation unit 32A has a splitter unit 310, the separation and detection unit 312, the demodulation unit 324, and the derivation unit 36. The splitting unit 310 branches the Rayleigh scattered light from the detection optical fiber 12 at a ½ ratio (50:50), and outputs the branched light to the separation and detection unit 312 (more specifically, to the first mixer 312a and the second mixer 312b). The splitting unit 310 of the present embodiment is a 3 dB splitting device (3 dB splitter).

The separation and detection unit 312 has the first mixer 312a, the second mixer 312b, a first A/D conversion unit 312c, and a second A/D conversion unit 312d, and extracts a first Rayleigh scattered light, which is a component corresponding to the first optical pulse, and a second Rayleigh scattered light, which is a component corresponding to the second optical pulse, from the Rayleigh scattered light from the detection optical fiber 12.

The first mixer 312a takes the first optical pulse from the third splitting unit 225 as local light, performs the detection of the Rayleigh scattered light from the detection optical fiber 12, extracts the first Rayleigh scattered light corresponding to the first optical pulse from the Rayleigh scattered light, and outputs the I, Q signals (analog signals) thereof. The second mixer 312b takes the second optical pulse from the fourth splitting unit 226 as local light, performs the detection of the Rayleigh scattered light from the detection optical fiber 12, extracts the second Rayleigh scattered light corresponding to the second optical pulse from the Rayleigh scattered light, and outputs the I, Q signals (analog signals) thereof.

The first A/D conversion unit 312c performs the A/D conversion of the I, Q signals of the first Rayleigh scattered light outputted from the first mixer 312a, thereby obtaining digital signals, and outputs the digital signals to the demodulation unit 324 (more specifically, the first demodulation unit 324a). The second A/D conversion unit 312d performs the A/D conversion of the I, Q signals of the second Rayleigh scattered light outputted from the second mixer 312b, thereby obtaining digital signals, and outputs the digital signals to the demodulation unit 324 (more specifically, the second demodulation unit 324b).

In those A/D conversion units 312c, 312d, the resolution of A/D conversion is only 6 bit, in the same manner as in the first embodiment, but in the present embodiment, the optical pulse is also divided by phase modulation using the Golay code sequence and 212 cells are formed. Therefore, by aggregating the cells in a single optical pulse during the demodulation thereof, it is possible to obtain the accuracy same as in the case of 18 bit (=6+12) resolution.

The demodulation unit 324 has the first demodulation unit 324a and the second demodulation unit 324b which perform the demodulation of the first Rayleigh scattered light and second Rayleigh scattered light corrected on the basis of phase variations detected by the phase measurement units 50A, 50B.

More specifically, the first demodulation unit 324a corrects the first Rayleigh scattered light on the basis of phase variations detected by the phase measurement unit 50A and then performs the demodulation of the corrected first Rayleigh scattered light that corresponds to the phase modulation in the first phase modulator 240a. The second demodulation unit 324b corrects the second Rayleigh scattered light on the basis of phase variations detected by the phase measurement unit 50B and then performs the demodulation of the corrected second Rayleigh scattered light that corresponds to the phase modulation in the second phase modulator 240b.

With the distributed optical fiber sound wave detection device 10A according to the present embodiment, by performing pulse compression using the predetermined code sequence, it is also possible to obtain the effect same as in the case in which sound wave detection is performed using an optical pulse having a small pulse width (pulse width corresponding to the cell width d) and a high signal strength. As a result, the sound waves striking at the regions in the longitudinal direction of the long detection optical fiber 12 can be detected with high sensitivity and high accuracy and a high longitudinal resolution can be realized.

Further, by using the optical pulse Pi obtained by combining (WDM) the first optical pulse and second optical pulse with mutually different wavelengths, as in the present embodiment, it is also possible to separate the received Rayleigh scattered light easily and reliably into the first Rayleigh scattered light and second Rayleigh scattered light. Therefore, high sensitivity and high-accuracy detection of sound waves can be performed more reliably, in the same manner as in the first embodiment. However, the configuration in which the optical pulse outputted by the light source 220 is split by the splitting unit (second splitting unit 224) into the first optical pulse and second optical pulse, as in the first embodiment, can reduce the number of light sources.

Third Embodiment

Figure 9:
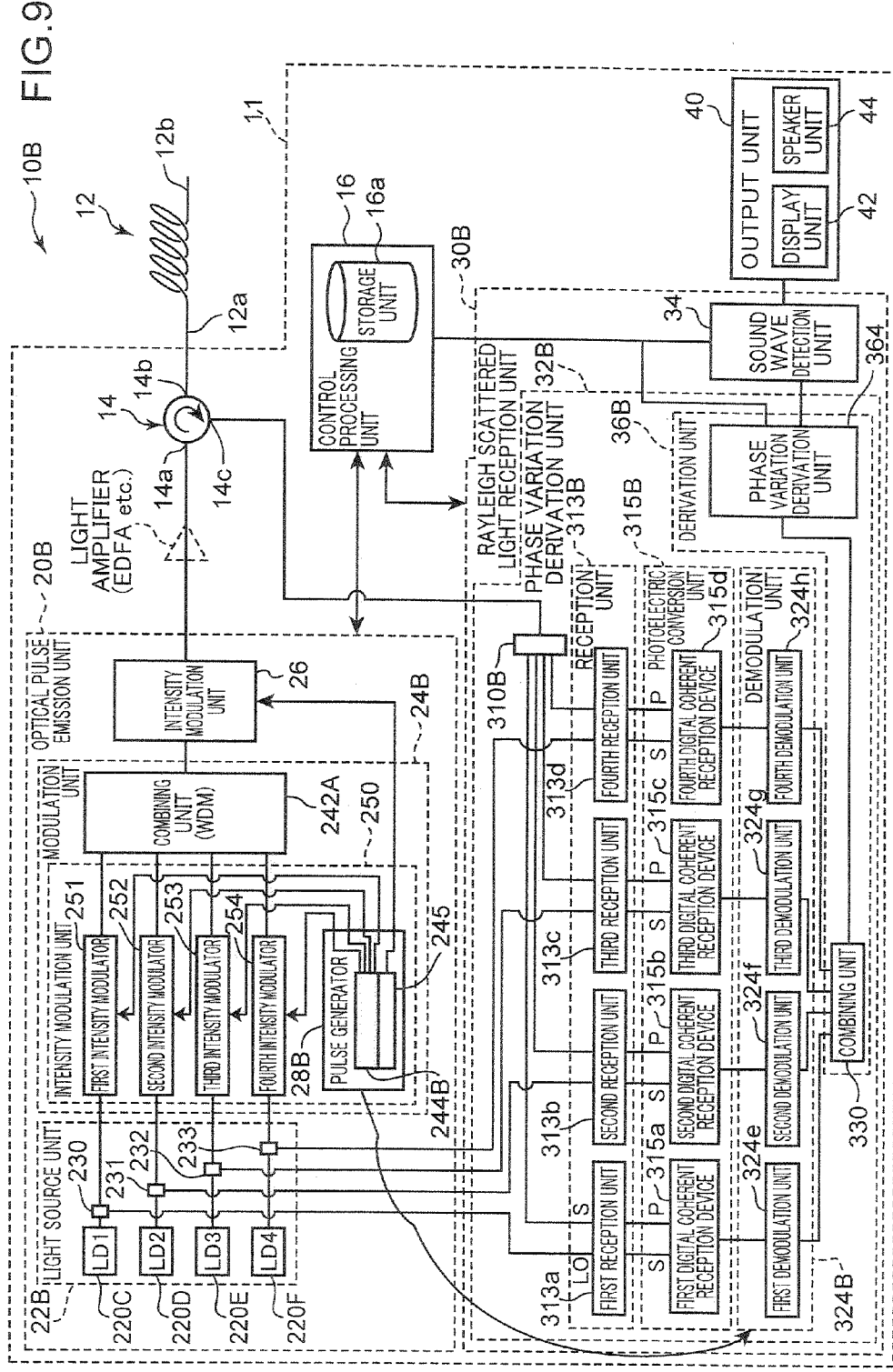
FIG. 9 is a functional block diagram showing the configuration of the distributed optical fiber sound wave detection device according to the third embodiment of the present invention.

The third embodiment of the present invention is explained below with reference to FIG. 9. The components same as in the first and second embodiments are assigned with same reference numerals and detailed explanation thereof is herein omitted. Only the different components are explained hereinbelow in detail.

A distributed optical fiber sound wave detection device 10B of the second embodiment is provided with the device main body 11 and the detection optical fiber 12. The device main body 11 is provided with an optical pulse emission unit 20B, the optical circulator 14, a Rayleigh scattered light reception unit 30B, the control processing unit 16, and the output unit 40. In the distributed optical fiber sound wave detection device 10B, when an optical pulse is divided into a plurality of cells, the division is performed by intensity modulation, rather than by phase modulation as in the distributed optical fiber sound wave detection devices 10, 10A of the first and second embodiments.

The optical pulse emission unit 20B is provided with a light source unit 22B that outputs an optical pulse of a predetermined frequency, a modulation unit 24B that performs intensity modulation of the optical pulse outputted by the light source unit 22B, and a pulse intensity modulation unit 26. The optical pulse is entered from the first end section 12a of the detection optical fiber 12 into the optical fiber 12.

The light source unit 22B has a first light source 220C, a second light source 220D, a third light source 220E, a fourth light source 220F, and splitting units 230, 231, 232, and 233.

The first light source 220C outputs the first optical pulse with a specific wavelength $\lambda 1$. The second light source 220D outputs the second optical pulse with a wavelength $\lambda 2$. The third light source 220E outputs the third optical pulse with a wavelength $\lambda 3$. The fourth light source 220F outputs the fourth optical pulse with a wavelength $\lambda 4$. The wavelengths $\lambda 1$, $\lambda 2$, $\lambda 3$, and $\lambda 4$ are different from each other. That is, the first light source 220C, second light source 220D, third light source 220E, and fourth light source 220F output optical pulses with mutually different wavelengths $\lambda$.

The splitting units 230, 231, 232, 233 split (branch) the optical pulses outputted from the corresponding light sources 220C, 220D, 220E, 220F, and the split optical pulses are outputted to the modulation unit 24B and a reception unit 313B of the Rayleigh scattered light reception unit 30B.

The modulation unit 24B has an intensity modulation unit 250 and the combining unit 242A and intensity-modulates and combines the first optical pulse, second optical pulse, third optical pulse, and fourth optical pulse outputted by the light source unit 22B (more specifically, the first light source 220C, second light source 220D, third light source 220E, and fourth light source 220F).

The intensity modulation unit 250 has a pulse generator 28B creating a code sequence (code) to be used for intensity modulation by using a pair of code sequences (pair codes) constituted by the first code sequence Ai and the second code sequence Bi, a first intensity modulator 251, a second intensity modulator 252, a third intensity modulator 253, and a fourth intensity modulator 254.

The pulse generator 28B has a code generating unit 244B that generates a code set to be used for intensity modulation of the optical pulses (first optical pulse, second optical pulse, third optical pulse, and fourth optical pulse), and the intensity modulation signal generating unit 245 that generates a signal (intensity signal) for intensity modulation of the combined optical pulse Pi.

The code generating unit 244B generates a code set constituted by a first-1 code sequence A1i, a first-2 code sequence A2i, a second-1 code sequence B1i, and a second-2 code sequence B2i by using the pair codes constituted by the first code sequence Ai and the second code sequence Bi as in the first and second embodiments. The code generating unit 244B outputs the generated code sequences (codes) to the intensity modulators 251, 252, 253, 254. More specifically, the code generating unit 244B outputs the first-1 code sequence A1i to the first intensity modulator 251, outputs the first-2 code sequence A2i to the second intensity modulator 252, outputs the second-1 code sequence B1i to the third intensity modulator 253, and outputs the second-2 code sequence B2i to the fourth intensity modulator 254.

More specifically, the first-1 code sequence A1i is $(1-Ai)/2$, the first-2 code sequence A2i is $(1+Ai)/2$, the second-1 code sequence B1i is $(1-Bi)/2$, and the second-2 code sequence B2i is $(1+Bi)/2$. Where an optical pulse is phase-modulated, as in the first and second embodiments, the value after the modulation can be negative, but where the optical pulse is intensity-modulated, the value after the modulation cannot be negative. For this reason, the aforementioned set of codes (four codes) are used instead of the pair codes in the first and second embodiments. Therefore, in the configuration in which an optical pulse is divided into a plurality of cells by intensity modulation, as in the distributed optical fiber sound wave detection device 10B of the present embodiment, at least four light sources 220C, 220D, 220E, 220F should be used.

The first intensity modulator 251 performs intensity modulation of the first optical pulse by using the first-1 code sequence A1i inputted from the pulse generator 28B (code generating unit 244B). The second intensity modulator 252 performs intensity modulation of the second optical pulse by using the first-2 code sequence A2i inputted from the pulse generator 28B (code generating unit 244B). The third intensity modulator 253 performs intensity modulation of the third optical pulse by using the second-1 code sequence B1i inputted from the pulse generator 28B (code generating unit 244B). The fourth intensity modulator 254 performs intensity modulation of the fourth optical pulse by using the second-2 code sequence B2i inputted from the pulse generator 28B (code generating unit 244B).

As a result of the first to fourth optical pulses being thus intensity-modulated by the intensity modulators 251, 252, 253, 254, respectively, the optical pulses are divided into a plurality of cells with a predetermined width d, in the same manner as in the first and second embodiments.

The Rayleigh scattered light reception unit 30B has a phase variation derivation unit 32B and the sound wave detection unit 34 and receives the Rayleigh scattered light produced in the detection optical fiber 12 by the incidence of the optical pulse (the optical pulse obtained by combining the first optical pulse, second optical pulse, third optical pulse, and fourth optical pulse that have mutually different wavelengths) Pi.

The phase variation derivation unit 32B has a scattered light splitting unit 310B, a reception unit 313B, a photoelectric conversion unit 315B, a demodulation unit 324B, and a derivation unit 36B.

The scattered light splitting unit 310B branches the Rayleigh scattered light from the detection optical fiber 12 at a ¼ ratio (25:25:25:25), and outputs the divided light to the reception unit 313B. The scattered light splitting unit 310B of the present embodiment is a 6 dB splitting device (6 dB splitter).

The reception unit 313B has first to fourth reception devices 313a, 313b, 313c, 313d and extracts the first Rayleigh scattered light that is a component corresponding to the first optical pulse, the second Rayleigh scattered light that is a component corresponding to the second optical pulse, the third Rayleigh scattered light that is a component corresponding to the third optical pulse, and the fourth Rayleigh scattered light that is a component corresponding to the fourth optical pulse from the Rayleigh scattered light from the detection optical fiber 12.

The first reception device 313a is connected to the scattered light splitting unit 310B, causes the first optical pulse from the splitting unit 230 to interfere as local light with the Rayleigh scattered light from the detection optical fiber 12, and extracts the first Rayleigh scattered light corresponding to the first optical pulse from the Rayleigh scattered light. Then, the first reception device 313a separates and outputs the P-polarized light and S-polarized light of the extracted first Rayleigh scattered light. The second reception device 313b is connected to the scattered light splitting unit 310B, causes the second optical pulse from the splitting unit 231 to interfere as local light with the Rayleigh scattered light from the detection optical fiber 12, and extracts the second Rayleigh scattered light corresponding to the second optical pulse from the Rayleigh scattered light. Then, the second reception device 313b separates and outputs the P-polarized light and S-polarized light of the extracted second Rayleigh scattered light. The third reception device 313c is connected to the scattered light splitting unit 310B, causes the third optical pulse from the splitting unit 232 to interfere as local light with the Rayleigh scattered light from the detection optical fiber 12, and extracts the third Rayleigh scattered light corresponding to the third optical pulse from the Rayleigh scattered light. Then, the third reception device 313c separates and outputs the P-polarized light and S-polarized light of the extracted third Rayleigh scattered light. The fourth reception device 313d is connected to the scattered light splitting unit 310B, causes the fourth optical pulse from the splitting unit 233 to interfere as local light with the Rayleigh scattered light from the detection optical fiber 12, and extracts the fourth Rayleigh scattered light corresponding to the fourth optical pulse from the Rayleigh scattered light. Then, the fourth reception device 313d separates and outputs the P-polarized light and S-polarized light of the extracted fourth Rayleigh scattered light.

The photoelectric conversion unit 315B has first to fourth digital coherent reception devices 315a, 315b, 315c, 315d and converts the optical signals (Rayleigh scattered light) from the reception devices 313a, 313b, 313c, 313d of the reception unit 313B into digital signals.

The first digital coherent reception device 315a performs A/D conversion of the P-polarized light and S-polarized light of the first Rayleigh scattered light from the first reception device 314a, combines the converted signals, and outputs a digital signal SA1. The second digital coherent reception device 315b performs A/D conversion of the P-polarized light and S-polarized light of the second Rayleigh scattered light from the second reception device 314b, combines the converted signals, and outputs a digital signal SA2. The third digital coherent reception device 315c performs A/D conversion of the P-polarized light and S-polarized light of the third Rayleigh scattered light from the third reception device 314c, combines the converted signals, and outputs a digital signal SB1. The fourth digital coherent reception device 315d performs A/D conversion of the P-polarized light and S-polarized light of the fourth Rayleigh scattered light from the fourth reception device 314d, combines the converted signals, and outputs a digital signal SB2.

The demodulation unit 324B has first to fourth demodulation units 324e, 324f, 324g, 324h and demodulates the digital signals SA1, SA2, SB1, and SB2 from the digital coherent reception devices 315a, 315b, 315c, 315d of the photoelectric conversion unit 315B correspondingly to the intensity modulation of the optical pulses (first to fourth optical pulses)

corresponding to the digital signals (first to fourth Rayleigh scattered light) in the intensity modulation unit 250.

The first demodulation unit 324e performs the demodulation (more specifically, SA1·A*) based on the code (first-1 code sequence A1i), which has been used in intensity modulation of the first optical pulse in the modulation unit 24B, with respect to the digital signal (signal corresponding to the first Rayleigh scattered light) SA1 outputted from the first digital coherent reception device 315a. The second demodulation unit 324f performs the demodulation (more specifically, SA2·A*) based on the code (first-2 code sequence A2i), which has been used in intensity modulation of the second optical pulse in the modulation unit 24B, with respect to the digital signal (signal corresponding to the second Rayleigh scattered light) SA2 outputted from the second digital coherent reception device 315b. The third demodulation unit 324g performs the demodulation (more specifically, SB1·B*) based on the code (second-1 code sequence B1i), which has been used in intensity modulation of the third optical pulse in the modulation unit 24B, with respect to the digital signal (signal corresponding to the third Rayleigh scattered light) SB1 outputted from the third digital coherent reception device 315c. The fourth demodulation unit 324h performs the demodulation (more specifically, SB2·B*) based on the code (second-2 code sequence B2i), which has been used in intensity modulation of the fourth optical pulse in the modulation unit 24B, with respect to the digital signal (signal corresponding to the fourth Rayleigh scattered light) SB2 outputted from the fourth digital coherent reception device 315d.

The derivation unit 36B includes a combining unit 330 and a phase variation derivation unit 364 and determines the phase variation $\Delta\Phi$ of the demodulated Rayleigh scattered light.

The combining unit 330 combines the digital signals corresponding to the first to fourth Rayleigh scattered light demodulated by the demodulation units 324e, 324f, 324g, 324h, and determines a phase $\phi$ of the received Rayleigh scattered light. More specifically, the combining unit 330 determines a signal (SA1−SA2)·A* from the signal SA1·A* demodulated by the first demodulation unit 324e and the signal SA2·A* demodulated by the second demodulation unit 324f, and also determines a signal (SB1−SB2)·B* from the signal SB1·B* demodulated by the third demodulation unit 324g and the signal SB2·B* demodulated by the fourth demodulation unit 324h. The combining unit 330 then determines a signal S=(SA·A*+SB·B*) corresponding to the phase $\Phi$ of the Rayleigh scattered light from the signals (SA1−SA2)·A* and (SB1−SB2)·B*. Here, SA=SA1−SA2 and SB=SB1−SB2.

The phase variation derivation unit 364 determines the difference (phase difference) $\Delta\Phi$ between the phase $\Phi$ of the Rayleigh scattered light that has been recently determined in the combining unit 330 and the phase $\Phi$ of the Rayleigh scattered light determined in the previous cycle.

When an optical pulse is divided into a plurality of cells by intensity modulation, as in the distributed optical fiber sound wave detection device 10B of the present embodiment, by performing pulse compression using a predetermined code sequence, it is also possible to obtain the effect same as in the case in which sound wave detection is performed using an optical pulse having a small pulse width (pulse width corresponding to the cell width d) and a high signal strength. As a result, the sound waves striking at each region in the longitudinal direction of the long detection optical fiber 12 can be detected with high sensitivity and high accuracy and a high longitudinal resolution can be realized.

It goes without saying that the distributed optical fiber sound wave detection device in accordance with the present invention is not limited to the above-described first to third embodiments, and various changes can be made without departing from the essence of the present invention.

The optical pulse emission units 20, 20A, 20B of the first to third embodiments are each provided with one unit (pulse unit) having the light source unit 22, 22A, 22B and the modulation unit 24, 24A, 24B, but such a configuration is not limiting. Thus, the optical pulse emission unit may be provided with a plurality of pulse units.

Figure 10:
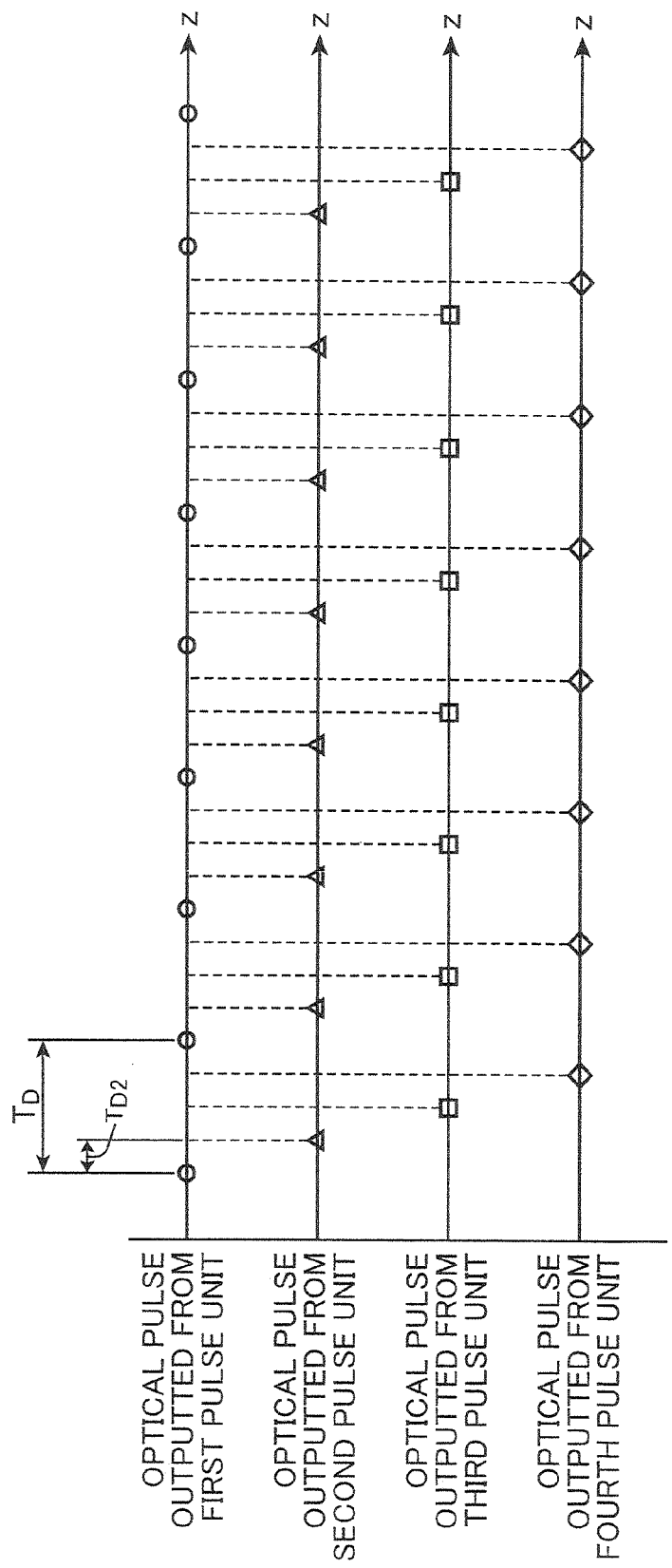
FIG. 10 is an explanatory drawing showing optical pulses outputted from a plurality of pulse units.

In this case, the optical pulses outputted from the pulse units have mutually different frequencies and are controlled by the control processing unit 16 such that the optical pulses are outputted so that the output timing of each of the optical pulses is shifted between the pulse units by the second time interval TD2, which is shorter than the first time interval TD, while the pulse units respectively output the optical pulses with the first time interval TD, as shown in FIG. 10. The optical pulses outputted by the pulse units are outputted into the same detection optical fiber 12.

As a result, the distribution of sound waves along the detection optical fiber 12 (that is, the distribution of the sound waves that have struck at the same time in the regions in the longitudinal direction of the detection optical fiber 12) can be detected for each short time interval (second time interval TD2). Thus, the distribution of sound waves along the detection optical fiber 12 can be detected with a high sampling rate (second time interval TD2).

Further, in the distributed optical fiber sound wave detection devices 10, 10A, 10B of the first to third embodiments, a plurality of optical pulses propagate (are scanned) over the first time interval TD at the same time in the detection optical fiber 12, but such a configuration is not limiting. Thus, a configuration may be used in which one optical pulse Pi is outputted from the optical pulse emission units 20, 20A, 20B, the Rayleigh scattered light that has been produced by the optical pulse Pi at the second end section 12b of the detection optical fiber 12 and has returned to the first end section 12a is received by the Rayleigh scattered light reception units 30, 30A, 30B, and then an optical pulse P2 is outputted. Thus, the distributed optical fiber sound wave detection device may be configured such that only one optical pulse propagates (is scanned) in the detection optical fiber 12.

In the distributed optical fiber sound wave detection devices 10, 10A, 10B of the first to third embodiments, the optical pulse is modulated using pair codes (for example, a Golay code sequence) for which the sum of autocorrelation function is a $\delta$-function, but such a configuration is not limiting. Thus, the code sequence used for modulating the optical pulse may be such that the autocorrelation function is independently a $\delta$-function, for example, may be an M sequence.

A phase measurement unit same as those of the first and second embodiments may be provided in the distributed optical fiber sound wave detection device 10B of the third embodiment. Where the phase measurement unit is provided in the distributed optical fiber sound wave detection device 10B of the third embodiment, the phase measurement unit is provided for each light source (first to fourth line sources 220C, 220D, 220E, 220F). Thus, with the distributed optical fiber sound wave detection device using a light source with a small phase variation with the passage of time (for example, a laser light source with a narrow beam width (less than 10 kHz)) in the outputted light, it is possible to ensure high accuracy in sound wave detection even without the phase measurement unit. However, where a light source (1 MHz to 3 MHz) is used that is used for usual optical communication, the phase variation is large. Therefore, a high accuracy of sound wave detection can be ensured by providing a phase measurement unit and removing the effect of phase variation caused by the light source (phase noise) from the Rayleigh scattered light.

When the phase variation caused by the light source is measured, the light phase is easily affected by temperature variations and vibrations. Therefore, it is preferred that the phase measurement unit be provided at a location with small temperature variations and vibrations inside the device main body of the distributed optical fiber sound wave detection device. For example, it is preferred that the phase measurement unit 50 be between the light source 220 and the first splitting unit 222, such as shown in FIG. 1, or between the second splitting unit 224 and the first phase modulator 240a (or the second phase modulator 240b), or between the optical circulator 14 and the first end section 12a of the detection optical fiber 12.

The above-described specific embodiments mainly include the invention having the following features.

The distributed optical fiber sound wave detection device according to an aspect of the present invention is a distributed optical fiber sound wave detection device that uses an optical fiber as a sensor and includes an optical pulse emission unit that causes an optical pulse to be incident into the optical fiber from one end of the optical fiber, and a Rayleigh scattered light reception unit that receives Rayleigh scattered light produced inside the optical fiber by the incidence of the optical pulse. The optical pulse emission unit outputs the optical pulse that is modulated using a code sequence which has a predetermined length based on a length dimension of the optical fiber and by which the optical pulse is divided into a plurality of cells of a predetermined width, and the Rayleigh scattered light reception unit includes a phase variation derivation unit that performs demodulation corresponding to the modulation in the optical pulse emission unit on the Rayleigh scattered light and determines a phase variation thereof from the demodulated Rayleigh scattered light, and a sound wave detection unit that determines a sound wave that has struck the optical fiber from the phase variation determined by the phase variation derivation unit.

In accordance with the present invention, the optical pulse (probe light) modulated by using the predetermined code sequence is entered into the optical fiber, and the demodulation corresponding to the modulation is performed with respect to the Rayleigh scattered light produced inside the optical fiber by the optical pulse (thus, pulse compression using the predetermined code sequence is performed). Such a configuration makes it possible to obtain the same effect as in the case in which the sound wave is detected using an optical pulse having a small pulse width (pulse width corresponding to the cell width) and a high signal strength. As a result, the sound wave that has struck various region in the longitudinal direction of a long optical fiber can be detected with high sensitivity and high accuracy, and a high resolution in the longitudinal direction (also referred to in the present description simply as "longitudinal resolution") can be realized.

More specifically, as a result of modulating an optical pulse by using a code sequence of a predetermined length (predetermined length based on the length dimension of the optical fiber), it is possible to ensure sufficient energy for detecting the sound wave in the optical pulse to be incident into the optical fiber. This is explained below in greater detail.

The pulse width of the optical pulse modulated by a long code sequence is large correspondingly to the length of the code sequence and, therefore, the optical pulse modulated by a long code sequence has larger energy. Accordingly, when Rayleigh scattered light is received that has been produced in the vicinity of the end section of the optical fiber on the side opposite that of the input end (end section from which the optical pulse is entered), the optical pulse modulated by the long code sequence that ensures sufficient signal strength necessary for sound wave detection is used for sound wave detection. As a result, even when the Rayleigh scattered light generated at any position in the longitudinal direction of the long optical fiber is received, this Rayleigh scattered light has a signal strength necessary (sufficient) for sound wave detection. Therefore, the sound wave that has struck the regions in the longitudinal direction of the long optical fiber can be detected with high sensitivity and high accuracy.

Further, where the optical pulse is divided by modulation into a plurality of cells, when Rayleigh scattered light is produced inside the optical fiber by the optical pulse, each cell of the Rayleigh scattered light includes (has) strain information on the site where the Rayleigh scattered light has been produced. As a result, a large number of types of strain information is obtained by measurements with a single optical pulse. Thus, since the strain information included in the cells is aggregated by demodulation of the received Rayleigh scattered light, it is possible to obtain strain information equivalent to that obtained by measuring strains at the site where the Rayleigh scattered light has been produced by using a large number (the number corresponding to the number of cells) of optical pulses. Thus, by performing pulse compression using the predetermined code sequence, it is possible to obtain a sufficient amount of strain information in the site of the optical fiber where the Rayleigh scattered light has been produced from the Rayleigh scattered light produced by a single optical pulse. As a result, even in the case of strains that are produced in the optical fiber by a sound wave striking the optical fiber and change over a very short time interval, such strains can be detected with good accuracy.

Further, as a result of dividing the optical pulse into a plurality of cells of a predetermined width by modulation, it is possible to obtain a longitudinal resolution same as in the case in which the measurements are performed using an optical pulse of a pulse width same as the cell width. Thus, as a result of dividing the optical pulse into cells of the number corresponding to the code sequence of a predetermined length such as described hereinabove, it is possible to realize a high longitudinal resolution corresponding to the cell width, while ensuring sufficient energy of the optical pulse and enabling the detection of the sound wave that has struck at a position of the optical fiber far from the input end.

More specifically, when an optical pulse (single pulse) that is not divided into a plurality of cells is used for detecting sound waves at two points spaced in the longitudinal direction of the optical fiber, where the pulse width is less than the distance between the two points, the Rayleigh scattered lights produced at the points cannot be distinguished from each other when the Rayleigh scattered lights generated at the point are received. In this case, where the optical pulse is divided into a plurality of cells by the modulation using a predetermined code sequence, each cell acts in the same manner as an optical pulse of a small pulse width, as mentioned hereinabove. Therefore, by diving the optical pulse into a plurality of cells of a small width by the modulation using the code sequence, it is possible to distinguish between the Rayleigh scattered lights produced at each point. As a consequence, it is possible to detect the phase variation of the Rayleigh scattered light produced at each point. As a result, the sound wave that has struck at each point can be detected, that is, a high longitudinal resolution can be realized.

Further, as a result of dividing the optical pulse into a plurality of cells of a small width, it is also possible to detect high-frequency sound waves.

In order to detect a high-frequency sound wave, in the case of a single pulse, the measurements should be performed using an optical pulse with a pulse width shorter than the distance traveled by the high-frequency sound wave over one period. In this case, where the optical pulse is divided into a plurality of cells by the modulation using a predetermined code sequence, each cell acts in the same manner as an optical pulse with a small pulse width, as mentioned hereinabove. Therefore, by dividing the optical pulse into a plurality of cells of a small width by the modulation using the code sequence, it is possible to detect a sound wave of a high frequency corresponding to the width of each cell.

The modulation in the optical pulse emission unit of the distributed optical fiber sound wave detection device may be phase modulation or intensity modulation. Thus, the optical pulse emission unit may output the optical pulse divided into a plurality of cells by phase modulation using the code sequence, or the optical pulse emission unit may output the optical pulse divided into a plurality of cells by intensity modulation using the code sequence. With either modulation, the optical pulse is divided into a plurality of cells, thereby making it possible to perform high-sensitivity and high-accuracy sound wave detection and also realize a high longitudinal sensitivity in sound wave detection with an optical fiber.

In the distributed optical fiber sound wave detection device, the width of each of the cells is set on the basis of the resolution in the longitudinal direction of the optical fiber in detection of the sound wave, and the optical pulse is modulated by the code sequence that enables the formation of the cells of the preset width.

When pulse compression using the above-described code sequence is performed, a sufficient amount of strain information on the site where the Rayleigh scattered light has been produced in the optical fiber is obtained by one optical pulse. Therefore, it is not necessary to perform measurements by sweeping the frequency of the optical pulse that is entered into the optical fiber. For this reason, the distributed optical fiber sound wave detection device may be configured such that the optical pulse emission unit has a light source unit that outputs an optical pulse of a predetermined frequency, and a modulation unit that performs phase modulation of the optical pulse outputted from the light source unit by using the code sequence. Thus, the sound waves that have struck in each region in the longitudinal direction of the long detection optical fiber can be detected with a high sensitivity and high accuracy and a high longitudinal resolution can be realized even by using the light source unit, which is simpler in configuration than a light source unit outputting optical pulses with variable frequency, in the optical pulse emission unit.

In the case of the abovementioned pulse compression, the configuration is preferred in which the light source unit outputs a first optical pulse and a second optical pulse; the modulation unit includes: a phase modulation unit that uses a pair of code sequences constituted by a first code sequence and a second code sequence such that a sum of auto-correlation functions is a δ-function, performs phase modulation of the first optical pulse with the first code sequence, and performs phase modulation of the second optical pulse with the second code sequence; and a combining unit that combines the first optical pulse and the second optical pulse that have been phase-modulated by the phase modulation unit, into a single optical pulse; and the phase variation derivation unit includes a separation unit that separates the Rayleigh scattered light into first Rayleigh scattered light corresponding to the first optical pulse and second Rayleigh scattered light corresponding to the second optical pulse; a demodulation unit that performs demodulation corresponding to the first code sequence with respect to the first Rayleigh scattered light separated by the separation unit and performs demodulation corresponding to the second code sequence with respect to the separated second Rayleigh scattered light; and a derivation unit that determines the phase variation from the demodulated first and second Rayleigh scattered light.

As a result of performing the pulse compression using a pair of code sequences such that the sum of autocorrelation function is a δ-function, when the phase variation is determined from the pair of Rayleigh scattered lights (first Rayleigh scattered light and second Rayleigh scattered light) separated in the separation unit, it is possible to eliminate the effect of the Rayleigh scattered light other than the pair of Rayleigh scattered lights. As a result, high-sensitivity and high-accuracy detection of sound waves can be performed more reliably.

In this case, a configuration may be used in which the light source unit includes a light source that outputs a linearly polarized optical pulse and a splitting unit that splits the optical pulse outputted from the light source into the first optical pulse and the second optical pulse, while maintaining the linear polarization, and outputs the split optical pulses, and the combining unit combines the first optical pulse and the second optical pulse in a state with mutually orthogonal polarization directions, and also a configuration may be used in which the light source unit includes a first light source that outputs the first optical pulse and a second light source that outputs the second optical pulse, and the first optical pulse and the second optical pulse have mutually different wavelengths. With either configuration, since the received Rayleigh scattered light can be easily and reliably separated into the first Rayleigh scattered light and second Rayleigh scattered light, high-sensitivity and high-accuracy detection of sound waves can be reliably performed. However, the configuration in which the optical pulse outputted by the light source is split into the first optical pulse and second optical pulse by the splitting unit can reduce the number of light sources.

When the light source unit has a light source and a splitting unit, a configuration is preferred which further includes a phase measurement unit that measures a phase of the optical pulse and detects a phase variation of the optical pulse caused by the light source, and in which the demodulation unit performs the demodulation of the first Rayleigh scattered light and the second Rayleigh scattered light that have been corrected on the basis of the phase variation detected by the phase measurement unit. Further, when the light source unit has a first light source and a second light source, a configuration is preferred which further includes a first phase measurement unit that measures a phase of the first optical pulse and detects a phase variation of the first optical pulse caused by the first light source, and a second phase measurement unit that measures a phase of the second optical pulse and detects a phase variation of the second optical pulse caused by the second light source, and in which the demodulation unit performs the demodulation of the first Rayleigh scattered light corrected on the basis of the phase variation detected by the first phase measurement unit and performs the demodulation of the second Rayleigh scattered light corrected on the basis of the phase variation detected by the second phase measurement unit.

With those configurations, the phase variation of the optical pulse caused by the light source is detected and the received Rayleigh scattered light is corrected on the basis of the measurement result before the demodulation corresponding to the modulation in the modulation unit is performed in the demodulation unit, thereby making it possible to inhibit the effect of phase variation of the demodulated Rayleigh scattered light caused by the light source. As a result, sound wave detection can be performed with higher accuracy. This is described below in greater detail.

With some light sources, the phase of the outputted light beam (optical pulse) changes with the passage of time, and such phase variation (temporal phase variations) is irregular. Therefore, where the received Rayleigh scattered light is directly demodulated when the light source with a variable phase is used in the distributed optical fiber sound wave detection device, a state is assumed in which the demodulated Rayleigh scattered light includes the effect (phase noise) of phase variation caused by the light source. Accordingly, the phase noise can be removed and the effect of the phase noise in the demodulated Rayleigh scattered light can be inhibited by measuring the phase variation of the optical pulse caused by the light source and correcting the Rayleigh scattered light prior to demodulation on the basis of the measurement result, as in the above-described configurations. As a result, sound waves can be accurately detected even when the light source is used in which the phase of the outputted light beam varies with the passage of time.

Further, in the distributed optical fiber sound wave detection device in accordance with the present invention, it is preferred that the light source unit output the optical pulses with a first time interval based on the frequency of the sound wave detected by the optical fiber; and the modulation unit perform phase modulation by a code sequence that differs for each optical pulse outputted from the light source unit.

With such a configuration, it is possible to use a long optical fiber as a sensor and detect a high-frequency (that is, a short-period sound wave) that has struck each region in the longitudinal direction of the optical fiber as the distribution of sound wave along the optical fiber. This is described below in greater detail.

According to the Nyquist sampling theorem, the sampling frequency should be two or more times the maximum frequency of the sound wave that is wished to be detected (measured). Thus, the sampling period (=1/(sampling frequency)) should be equal to or less than half of the period of the sound wave that is the detection object. In his case, the distribution of the sound waves that can be detected (scanned) by one optical pulse (distribution of sound waves that have struck each region in the longitudinal direction) is within a range in which the optical pulse can move back and forth inside the detection optical fiber over the sampling period of time. In a sound wave with a high frequency (for example, ultrasound wave), one period is short and, therefore, the range in which the optical pulse can move back and forth in the detection optical fiber over half thereof (half-period of the high-frequency sound wave) is short. As a consequence, a range in which the high-frequency sound wave can be detected by one optical pulse as a distribution along the optical fiber is narrow (short). For this reason, where the sampling period is set to be equal to or longer than the optical pulse reciprocation time when the optical fiber used as a sensor is longer than the range in which the optical pulse can move back and forth over the half-period of the sound wave to be detected, aliasing occurs in the sound wave spectrum and the detected sound wave is disturbed. Further, where the sampling period is set to be equal to or shorter than the optical pulse reciprocation period, the Rayleigh scattered light is received simultaneously from a plurality of regions in the longitudinal direction of the optical fiber and the entire distribution of sound waves cannot be detected.

Accordingly, by outputting an optical pulse with a time interval (first time interval) shorter than the half-period of the sound wave that is the detection object (when the frequency band of the sound waves that are the detection object is wide, the sound wave with the highest frequency in this frequency band) it is possible to advance a plurality of optical pulses with a predetermined interval (interval corresponding to the first time interval) in the optical fiber, thereby making it possible to scan the entire region in the longitudinal direction of the optical fiber over the half-period with the plurality of optical pulses and to receive successively the Rayleigh scattered light from each region in the longitudinal direction. Meanwhile, since the optical pulses outputted with the interval are phase-modulated by the mutually different (mutually independent) code sequences, by demodulating the received Rayleigh scattered light, it is possible to identify the optical pulse that produced the Rayleigh scattered light.

Therefore, even when a high-frequency (one period is short) sound wave is detected using a long optical fiber as a sensor, the distribution of sound waves along the optical fiber can be detected with good accuracy by outputting the optical pulses with the first item interval.

When the optical pulses are outputted with the first time interval, a configuration may be used in which the optical pulse emission unit includes a plurality of pulse units each having the light source unit and the modulation unit, the optical pulses outputted from the pulse units have mutually different frequencies, and the plurality of pulse units outputs the optical pulses successively so that an output timing of each of the optical pulses is shifted between the pulse units by a second time interval which is shorter than the first time interval, while the pulse units respectively output the optical pulses with the first time interval.

With such a configuration, the distribution of the high-frequency sound waves along the optical fiber (that is, the distribution of the sound waves that have simultaneously struck the regions in the longitudinal direction of the optical fibers) can be detected for each short time interval (second time interval). Therefore, the distribution of high-frequency sound waves along the optical fiber can be detected with a high sampling rate (time resolution) corresponding to the second time interval.

It follows from the above, that the present invention can provide a distributed optical fiber sound wave detection device that can detect a sound wave with high sensitivity and high accuracy and also realize high resolution.

The invention claimed is:

1. A distributed optical fiber sound wave detection device that uses an optical fiber as a sensor, comprising:
   an optical pulse emission unit that causes an optical pulse to be incident into the optical fiber from one end of the optical fiber; and
   a Rayleigh scattered light reception unit that receives Rayleigh scattered light produced inside the optical fiber by the incidence of the optical pulse, wherein
   the optical pulse emission unit outputs the optical pulse that is modulated using a code sequence which has a predetermined length based on a length dimension of the optical fiber and by which the optical pulse is divided into a plurality of cells of a predetermined width, and
   the Rayleigh scattered light reception unit includes:
   a phase variation derivation unit that performs demodulation corresponding to the modulation in the optical pulse emission unit on the Rayleigh scattered light and determines a phase variation thereof from the demodulated Rayleigh scattered light; and
   a sound wave detection unit that determines a sound wave that has struck the optical fiber from the phase variation determined by the phase variation derivation unit.

2. The distributed optical fiber sound wave detection device according to claim 1, wherein the modulation is phase modulation.

3. The distributed optical fiber sound wave detection device according to claim 1, wherein the modulation is intensity modulation.

4. The distributed optical fiber sound wave detection device according to claim 1, wherein the width of each of the cells is based on a resolution in a longitudinal direction of the optical fiber in detection of the sound wave.

5. The distributed optical fiber sound wave detection device according to claim 1, wherein the optical pulse emission unit includes a light source unit that outputs an optical pulse of a predetermined frequency, and a modulation unit that performs phase modulation of the optical pulse outputted from the light source unit by using the code sequence.

6. The distributed optical fiber sound wave detection device according to claim 5, wherein
the light source unit outputs a first optical pulse and a second optical pulse,
the modulation unit includes:
a phase modulation unit that uses a pair of code sequences constituted by a first code sequence and a second code sequence such that a sum of auto-correlation functions is a δ-function, performs phase modulation of the first optical pulse with the first code sequence, and performs phase modulation of the second optical pulse with the second code sequence; and
a combining unit that combines the first optical pulse and the second optical pulse that have been phase-modulated by the phase modulation unit, into a single optical pulse, and
the phase variation derivation unit includes:
a separation unit that separates the Rayleigh scattered light into first Rayleigh scattered light corresponding to the first optical pulse and second Rayleigh scattered light corresponding to the second optical pulse;
a demodulation unit that performs demodulation corresponding to the first code sequence with respect to the first Rayleigh scattered light separated by the separation unit and performs demodulation corresponding to the second code sequence with respect to the separated second Rayleigh scattered light; and
a derivation unit that determines the phase variation from the demodulated first and second Rayleigh scattered light.

7. The distributed optical fiber sound wave detection device according to claim 6, wherein
the light source unit includes a light source that outputs a linearly polarized optical pulse, and a splitting unit that splits the optical pulse outputted from the light source into the first optical pulse and the second optical pulse, while maintaining the linear polarization, and outputs the split optical pulses, and
the combining unit combines the first optical pulse and the second optical pulse in a state with mutually orthogonal polarization directions.

8. The distributed optical fiber sound wave detection device according to claim 7, further comprising a phase measurement unit that measures a phase of the optical pulse and detects a phase variation of the optical pulse caused by the light source, wherein
the demodulation unit performs the demodulation of the first Rayleigh scattered light and the second Rayleigh scattered light that have been corrected on the basis of the phase variation detected by the phase measurement unit.

9. The distributed optical fiber sound wave detection device according to claim 6, wherein
the light source unit includes a first light source that outputs the first optical pulse, and a second light source that outputs the second optical pulse, and
the first optical pulse and the second optical pulse have mutually different wavelengths.

10. The distributed optical fiber sound wave detection device according to claim 9, further comprising:
a first phase measurement unit that measures a phase of the first optical pulse and detects a phase variation of the first optical pulse caused by the first light source; and
a second phase measurement unit that measures a phase of the second optical pulse and detects a phase variation of the second optical pulse caused by the second light source, wherein
the demodulation unit performs demodulation of the first Rayleigh scattered light corrected on the basis of the phase variation detected by the first phase measurement unit and performs demodulation of the second Rayleigh scattered light corrected on the basis of the phase variation detected by the second phase measurement unit.

11. The distributed optical fiber sound wave detection device according to claim 5, wherein
the light source unit outputs the optical pulses with a first time interval based on a frequency of a sound wave detected by the optical fiber, and
the modulation unit performs phase modulation by a code sequence that differs for each optical pulse outputted from the light source unit.

12. The distributed optical fiber sound wave detection device according to claim 11, wherein
the optical pulse emission unit includes a plurality of pulse units each having the light source unit and the modulation unit,
the optical pulses outputted from the pulse units have mutually different frequencies, and
the plurality of pulse units outputs the optical pulses successively so that an output timing of each of the optical pulses is shifted between the pulse units by a second time interval which is shorter than the first time interval, while the pulse units respectively output the optical pulses with the first time interval.

* * * * *